(12) United States Patent
McRae et al.

(10) Patent No.: US 7,042,438 B2
(45) Date of Patent: May 9, 2006

(54) HAND MANIPULATED DATA APPARATUS FOR COMPUTERS AND VIDEO GAMES

(76) Inventors: Michael William McRae, 4025 Central Ave., Fair Oaks, CA (US) 95628; Adrian Gregory Albright, 216 Fremantle Ct., Roseville, CA (US) 95747; Seth Harold McIver, 2321 Mossybank Dr., Unit #5, Sacramento, CA (US) 95833

( * ) Notice: Subject to any disclaimer, the term of this patent is extended or adjusted under 35 U.S.C. 154(b) by 62 days.

(21) Appl. No.: 10/656,763

(22) Filed: Sep. 6, 2003

(65) Prior Publication Data
US 2005/0052412 A1   Mar. 10, 2005

(51) Int. Cl.
*G09G 5/00* (2006.01)
*G09G 5/08* (2006.01)

(52) U.S. Cl. ............... 345/156; 345/157; 345/158; 345/160

(58) Field of Classification Search ........ 345/156–169; 341/20–22
See application file for complete search history.

(56) References Cited

U.S. PATENT DOCUMENTS

| | | | |
|---|---|---|---|
| 4,414,537 A | | 11/1983 | Grimes |
| 4,988,981 A | | 1/1991 | Zimmerman et al. |
| 5,444,462 A | | 8/1995 | Wambach |
| 5,488,362 A | | 1/1996 | Ullman et al. |
| 5,489,922 A | | 2/1996 | Zloof |
| 5,581,484 A | | 12/1996 | Prince |
| 5,638,092 A | * | 6/1997 | Eng et al. .............. 345/158 |
| 5,999,166 A | * | 12/1999 | Rangan .................. 345/157 |
| 6,049,327 A | * | 4/2000 | Walker et al. .......... 345/158 |
| 6,097,369 A | | 8/2000 | Wambach |
| 6,154,199 A | | 11/2000 | Butler |
| 6,526,669 B1 | | 3/2003 | Nagata |
| 6,540,607 B1 | | 4/2003 | Mokris et al. |
| 2004/0012564 A1 | * | 1/2004 | Zngf et al. ............. 345/158 |

OTHER PUBLICATIONS

Ergo Touch, "Rocket Mouse", Owner's Manual, (1 page, double sided).
Essential Reality, "The P5 Controller User Manual", User Manual, (8 pages, single sided).
Essential Reality, "The P5 Gaming Glove", Description and Specifications (2 pages, single sided).

* cited by examiner

*Primary Examiner*—Vijay Shankar

(57) ABSTRACT

A computer or video game device for generating hand manipulated data. The device consists of one or more sensors that are mounted on the human hand. The sensors are conveniently located for easy access and manipulation by opposing fingers on the same hand that the sensors are mounted on. This arrangement overcomes the limitations of a tabletop computer mouse by not requiring a planar surface, and by not requiring the user to hold onto the device. Additionally the sensors are located in such a way that they do not impede standard office procedures such as using a computer keyboard, writing with a pen, holding a phone, etcetera. The device can also be quickly and easily attached or removed by the user. Various embodiments of the invention include "wired", "wireless", multiple finger, universal right or left-hand, universal finger or thumb application, and universal side or top mounted sensors. Existing technologies and manufacturing techniques are utilized to minimize cost. Uses include personal computer, video game, and industrial applications.

26 Claims, 14 Drawing Sheets

HAND MANIPULATED DATA APPARATUS FOR COMPUTERS AND VIDEO GAMES

BACKGROUND

1. Field of Invention

This invention relates to a human machine interface and, more particularly, to a computer mouse type device for entering data to a computer, video game, or similar machine.

2. Description of Prior Art

It is known in the field of computers to utilize remote computer interface devices that are hand-operated and used in conjunction with the keyboard. A well-known computer interface device is commonly known as the computer mouse, wherein the mouse is moved by hand over a planar work surface to move the cursor on the computer monitor. The mouse also typically includes an electrical switch that can be activated when the cursor is in a desired location in order to cause an entry to the computer.

A problem with the mouse-type devices is that the mouse is used in connection with a keyboard for data input. As a result, the user must repeatedly move his or her hand between the keyboard and the computer mouse work surface. This hand movement required for the operation of the computer mouse is both inefficient and tiring to the user. Therefore, a need exists for a mouse-type computer interface device that does not require the user to move his or her hand from the keyboard to a remote location in order to enter mouse-type data into the computer. Additionally this device must not interfere with keyboard use, or the use of other standard office equipment.

Another problem with mouse-type devices is associated in their use with laptop computers. The environment in which a laptop computer is used will typically eliminate planar surfaces as required by the typical computer mouse. Similarly, wireless computer keyboards have been recently introduced to the market place. However the user cannot fully utilize the remote capabilities of these wireless keyboards because the user must be near a planar surface in order to use a tabletop mouse. Therefore, a need exists for a mouse-type computer interface device that does not require a planar surface to operate the mouse.

Many alternatives exist for the computer mouse. It will be seen however that most computer mouse alternatives suffer from at lease one of three major problems in the industry. The first major problem in the industry relates to developing new hand-eye-coordination skills. For example, conventional computer mouse users have developed their hand-eye-coordination skills to manipulate a mouse curser through a single sensor (i.e. a track-ball, mouse-stick, optical sensor, touch-pad, etcetera.). However many computer mouse alternatives require multiple sensors for mouse cursor control, and hence require multiple body parts to manipulate those sensors. Moving these multiple body parts (hands, fingers, wrist, etcetera) in a coordinated effort requires an entirely new hand-eye-coordination skill set. Therefore a need exists for a mouse alternative that does not require a new hand-eye-coordination skill set.

The second major problem in the industry is related to accidental sensor activation (accidental data entry). Most computer mouse alternatives are prone to accidental sensor activation in one way or another. This includes accidental sensor activation caused by movements of the human hand, and accidental sensor activation caused by touching or holding things with the human hand. For example, virtual reality type gloves detect hand motions, and will move the mouse cursor and enter commands by any movement of the hands, fingers, or wrist. This is a particular issue when moving the wrist and fingers to type on a keyboard. Other alternatives locate the sensors on parts of the hand that subject them to accidental activation when holding a glass, writing with a pen, typing on a keyboard, or performing other standard operations. Still other solutions separate the mouse cursor movement function from the mouse "click" function to such an extreme that once the desired cursor position is obtained, the user must then reposition the hand (and hence loose the desired cursor position) in order to activate the mouse "click" feature. Therefore the use of such devices brings practical computer operation to a standstill. Here too a need exists for a mouse alternative that avoids accidental sensor activation.

The third major problem in the industry is related to the tactile and gripping ability of the human hand. As will be seen, many virtual reality glove type devices cover the finger-pads of the human hand. In other words; devices that locate sensors in the fingertip area also cover the finger-pads. In doing so the user is left without the tactile touch senses and gripping surfaces of the fingertips. This is particularly important when considering the registration "bumps" on the "F", "J", and "5" keys of a computer keyboard. Therefore a need exists for a mouse alternative that leaves the finger-pads exposed when locating sensors in the fingertip area.

For example, U.S. Pat. No. 4,414,537 (Grimes) describes a glove equipped with sensors for detecting sign-language character type hand movements. This invention requires the user to be fluent in Single Hand Manual Alphabet for the American Deaf. Although unique, this invention is expensive to manufacture with its many sensors. It should also be noted that the "F", "J", and "5" keys on a computer keyboard have special Braille type bumps that are sensed by the user's fingertips to properly locate the hands and fingers on the keyboard. This invention violated that ability by covering the fingertips. Therefore this invention would make it difficult for an operator to type. Additionally, it would be very difficult for the user to write with a pen, or answer the phone without accidentally entering data. Lastly, this invention is not well suited to generate mouse-type cursor data.

U.S. Pat. No. 4,988,981 (Zimmerman, et al) describes a glove-type device used to manipulate virtual computer objects. The glove has several sensors and ultrasonic transmitters, and the computer monitor has several ultrasonic receivers. The sensors are used to determine hand manipulation and the ultrasonic transmitters and receivers are used to determine relative hand position. This invention is well suited to determine virtual three-dimensional positioning, and the manipulation of virtual computer objects. However the many sensors and ultrasonic transmitters and receivers make the device complicated and expensive. Additionally, as compared to a conventional computer mouse, the device requires excessive computer processing to manipulate the virtual objects. The invention also conceals the tips of the fingers whereby the user looses tactile senses as needed for keyboard operation. Lastly, it would be very difficult for the user to operate the keyboard, write with a pen, or answer the phone without accidentally entering data.

U.S. Pat. No. 5,489,922 (Zloof) utilizes two concentric rings placed on the index finger of each hand. The user spins the ring on the right hand for vertical cursor movement, and the ring on the left hand for horizontal cursor movement. Further, each ring can be depressed to activate a switch so as to simulate a typical mouse button. Although a novel invention, this device requires the user to learn a whole new set of hand-eye coordination skills. This is because the horizontal and vertical cursor movements originate from two different sensors, and hence requires two different and independent body functions. Even more, the user must combine these two new hand-eye coordination skill sets in order to have fluid cursor movement. This in itself is yet another hand-eye coordination skill that must be mastered by the user. Additionally the cost and labor to manufacture a device that requires two sensors for a cursor movement is more costly than a device that only requires one. The device is also very mechanical in nature and is subject failure and repeated maintenance. Further, this invention is intended for use by persons who have two hands. Therefore a disabled or handicapped person having only one hand or missing fingers would have difficulty in using these devices. Lastly, it would be very difficult for the user to operate the keyboard or answer the phone without accidentally entering data.

U.S. Pat. No. 5,444,462 (Wambach), and U.S. Pat. No. 6,097,369 (Wambach) both describe a glove type device that has various sensors mounted on it. Vertical cursor movement is obtained by moving the index finger up and down, and horizontal cursor movement is obtained by rotating the wrist left or right. Although novel inventions, these devices require the user to learn a whole new set of hand-eye coordination skills. This is because the horizontal and vertical cursor movements originate from two different sensors, and hence requires the user to manipulate two different body-parts. This requires the user to learn and develop two new, different, and independent hand-eye coordination skills. Even more, the user must combine these two skills together in order to have fluid cursor movement. This in itself is yet another new hand-eye coordination skill that must be mastered by the user. Additionally the cost and labor to manufacture a device that requires two sensors for cursor movement is more costly than a device that only requires one sensor. Having the sensors mounted in a glove-type fashion also presents a problem, as the glove cannot be conveniently attached or removed. This makes it more difficult to use the bathroom, wash hands, etcetera. Finally, it would be nearly impossible to use the computer keyboard or perform other standard office functions without accidentally activating the sensors on these devices. Therefore these units must be disabled or entirely removed when the user does not wish to generate mouse commands.

U.S. Pat. No. 6,526,669 B2 (Nagata), describes a hand-mounted device used to acquire finger manipulation data. The data obtained from this device is used to analyze human finger movements in order to better understand and operate robot hands. Although an interesting invention, this device interferes with computer keyboard entry by requiring the user to wear a sensor cap on each fingertip. This cap blocks the sensory tactile touch as needed by the user for keyboard operation. Additionally the sensors used in the device are expensive, bulky, cannot be easily attached or removed, and are not well suited for mouse equivalent data.

U.S. Pat. No. 6,154,199 (Butler), describes a glove-type device that has a track-ball mounted on the side of the index finger, and buttons mounted on the palm of the hand. Cursor movement is obtained by manipulating the track-ball with the thumb, and button activation by pushing the palm-mounted buttons with the fingers. Although an interesting invention, this device has several limitations as follows:

1. The user must make a conscience effort to not accidentally strike a computer keyboard key while sweeping the fingers around to press the palm-mounted buttons. In other words, when transitioning from keyboard entry to palm-button activation, the invention requires the user to elevate his or her hand away from the keyboard in order to avoid accidentally striking a keyboard key.
2. The invention is limited to a track-ball sensor for cursor movement and does not consider other sensor types such as a mouse-stick, optical sensor, scroll-wheels, etcetera.
3. The user must use two different fingers to execute the computer "drag-and-drop" command. This is because one finger must be activating one of the palm-mounted buttons, while the thumb simultaneously activates the track-ball.
4. The palm-mounted buttons will be accidentally activated when performing standard tasks such as holding a drinking glass, answering the phone, shaking hands, pushing against the armrests of a chair while standing up, etcetera.
5. The invention fails to utilize a convenient means to turn the unit on or off.
6. The invention does not consider mounting sensors on the thumb or other fingers of the hand.
7. The glove type device cannot be quickly and conveniently attached or removed. This makes it more difficult to wash hands, shake hands, use the bathroom, or perform other hygiene functions.
8. The invention would require periodic sterilizing and cleaning similar to that of an article of clothing. This would be especially necessary in the event that multiple operators were using the same device.

U.S. Pat. No. 5,581,484 (Prince), describes a glove type device with sensors mounted on the fingertips. This device is attached to a computer which interprets relative finger positions as the fingers are moved and pressed against a flat surface such as a tabletop. The manner in which each sensor reacts during each virtual keystroke allows the computer to predict what key the user intends to depress. This allows the user to incorporate any flat surface as a virtual keyboard. Although a novel invention for keyboard entry, this device is not well suited to generate mouse equivalent data. The many sensors are also expensive and would be accidentally activated when using the computer mouse, answering the phone, etcetera. Lastly, this glove type device cannot be easily attached or removed.

U.S. Pat. No. 5,638,092 (Eng, et al), describes a ring type device that is mounted on the finger of a computer user. The ring transmits a signal that is received by multiple receivers imbedded in the computer keyboard. The receivers determine cursor movement as the ring is moved up, down, and across the keyboard. A special button is mounted adjacent to the keyboard space bar to accommodate the mouse "click" button feature. Although an interesting invention, this device requires specialized computer keyboards with multiple receivers. These keyboards would be expensive and would make it difficult to use the ring device with existing computers without also replacing the keyboard. This device also requires the user to remove the ring-hand from the keyboard position, and then move it according to desired cursor direction. Then the user must reposition the ring-hand on the keyboard. This tedious back and forth procedure requires the user to abandon their keyboard hand position just to try and find it again. This device has also divided the hardware and operator means of generating mouse equivalent data. Cursor position is generated by moving the ring, but the mouse "click" button is placed on the keyboard. This prevents the user from generating mouse equivalent data within the confines of a single hand. This leads to the ultimate shortcoming of the device. This shortcoming is due to the fact that once the user locates the ring for desired cursor position; the user must then move the hand (ring) back to the keyboard "click" button in order to activate the mouse command. In doing so, the user looses the desired cursor position. Therefore the user is unable to simultaneously position the curser and click the keyboard mouse button with a single hand. Hence the device is unable to function as a computer mouse replacement. Additionally, the user's hand must never leave the proximity of the receivers in the computer keyboard as this would render the device unusable. Therefore the user is always tethered to the computer keyboard. Lastly, the cursor will be moving across the screen in an uncontrolled manner as the user types on the keyboard. This will be an obvious annoyance the user.

Pub. No.: US 2004/0012564 A1 (Zngf, et al), describes a virtual reality glove type device that has a tilt sensor mounted on the back of the hand, and bending sensors mounted on each finger of the glove. As the user rotates their wrist between 0–180 degrees, the tilt sensor changes the corresponding roll-angle of the on-screen cursor. Once the desired angle of travel is obtained, the user then moves the thumb toward the index finger in order to move the cursor from left-to-right along the angular line of travel. Likewise the user moves the index finger toward the thumb to move the cursor from right-to-left along the line of travel. Once the cursor is at the desired location, the user then activates the mouse "click" button by bending either the middle, ring, or little finger. Although unique, this device has several limitations as follows:

a) The device requires the user to learn a whole new hand-eye-coordination skill set. This is due to the fact that cursor movement is obtained from three different sensors instead of just one. Hence, three different body elements (wrist, thumb, index-finger) are required to move the cursor instead of just one body element. This puts the invention at a disadvantage when compared to devices that obtain cursor movement from a single sensor.

b) The device cannot be used when performing any other function such as typing on the keyboard. This is due to the fact that as the user types (or performs other functions), the mouse cursor will be moving across the computer screen in an uncontrolled manner. Adding simultaneous "mouse-click" activation from the middle, ring, and little finger will bring complete mayhem to the computer environment.

c) The cost and labor to manufacture a device that requires three sensors for cursor movement is more costly than a device that only requires one sensor.

d) The device is not designed for universal right or left hand operation. This is due to the fact that when the device is moved from the right hand to the left, all of the sensors will function in the opposite direction. This would be a particular problem for ambidextrous users. This problem would require expensive bi-directional sensors, and/or a separate device program for left handed users. Additionally, using the device on the left hand places the sensors on the wrong side of the glove. This may interfere with other work functions.

e) The device fails to utilize a convenient means to turn the unit on or off.

f) The glove type device cannot be quickly and conveniently attached or removed. This makes it more difficult to wash hands, shake hands, use the bathroom, or perform other hygiene functions.

g) The device would require periodic sterilizing and cleaning similar to that of an article of clothing. This would be especially necessary in the event that multiple operators were sharing the same device.

h) The device requires the user to rotate the wrist between 0–180 degrees. This is a difficult task to perform and could eventually lead to a repetitive-stress injury.

i) The device fails to utilize wireless communications whereby the user would not be tethered to the computer.

j) The device requires the use of all the fingers of the human hand, and therefore cannot be used by handicapped persons who are missing one or more fingers.

U.S. Pat. No. 6,049,327 (Walker, et al), describes a virtual reality glove type device that is used to control computer animations. The glove contains a hand shaped circuit board that is placed on the backside of the hand. This flexible circuit board has a special characteristic in that it can detect flexation. In doing so the device can detect finger and thumb movements. Hand gestures are thereby converted to computer commands for controlling computer-based animations. Although a unique invention, the device is not well suited for mouse equivalent computer commands. This is due to the fact that the unit fails to include a mouse "click" button. Additionally, the device cannot be used when performing other functions such as typing on the keyboard. This is due to the fact that as the user types, the mouse cursor will be moving across the computer screen in an uncontrolled manner.

U.S. Pat. No. 5,999,166 (Rangan), describes a three-dimensional positioning device that utilizes optical electronics. The device consists of a tabletop enclosure that has a light source and a light detector. The user wears a ring type reflector that positions a small mirror on the underside of the hand. Light is then shone upward from the tabletop unit to the mirrored reflector under the hand. The user then moves the hand (reflector) over the device to reflect the light source to specific locations on the light detector. Reflecting light on different areas of the light detector results in a corresponding two-dimensional mapping, or cursor positioning, on the computer screen. Third-dimensional command data (if needed) is obtained by raising the reflector and hence lowering the intensity of reflected light on the light detector. Once the cursor is in the desired location, the user then depresses one of the buttons located on the front (finger) side of the tabletop unit. Although an interesting invention, the device would be difficult to use in place of a computer mouse. This shortcoming is due to the fact that once the user locates the reflector ring for desired cursor position; the user must then move the hand (ring) back to a location where the buttons can be depressed. In doing so, the user looses the desired cursor position. This problem is further magnified when the reflective ring is worn on the same finger that will be moving downward to depress the mouse button. Therefore the user is unable to simultaneously position the curser and click the mouse button. Hence the device does not function as a computer mouse replacement. Additionally, the user's hand must never leave the proximity of the tabletop unit, as this would render the device unusable. Therefore the user is always tethered to the computer desk.

The Rocket Mouse (by ErgoTouch) is another computer mouse type device. This unit has a track-ball and mouse buttons mounted in a hand-held package. The user holds the device between the index finger and the thumb. Activation of the track-ball and mouse buttons is by way of the thumb. Although an exiting invention, this device requires the user to hold onto it. Therefore the unit must be put down in order to use the keyboard, answer the phone, write with a pen, etceteras.

Another application for data entry devices is for video and computer games. These devices, called "controllers", are well known and typically involves some kind of hand held joystick with multiple buttons, ray guns, race car steering wheels, and so on. Like a computer mouse, most of these devices require the user to hold onto them. Therefore the user must put the device down in order to use a second data input device, answer the phone, etcetera. Additionally, devices such as a steering wheel and foot pedals are stationary and do not provide users the freedom to move about. Therefore, a need exists for a portable device that does not require the user to hold onto it, and one which doesn't interfere with other activities such as using a second data input device or answering the phone. Further, video and computer game operators enjoy the feeling of becoming engrossed in the game by having a data input device attached to their body in some manner. Therefore a need exists for a device that can be easily attached and removed from the user's body.

Virtual reality has also recently gained much interest in the video and computer game industry. However, these devices typically rely on expensive transmitters and receivers to obtain relative positioning. They are also typically arranged in a glove type fashion that blocks the users tactile senses, and makes attachment and removal of the device more cumbersome. These devices also make it difficult to perform other tasks such as answering the phone or using the computer keyboard without accidentally entering a command. Lastly, these devices are not well suited for other uses such as generating mouse equivalent data One such example is U.S. Pat. No. 6,540,607 B2 (Mokris, et al), describes a video or computer game device that detects the location and orientation of a pointing device or gun. This is accomplished by mounting infrared transmitters on the gun, and infrared receivers on the video or computer display. The receivers determine the relative signal delay between the various transmitters to determine position and orientation. This device is well suited for video game applications that require a point and shoot type of user interface. However it requires the user to hold onto the pointing device. Therefore the user must put the device down in order to perform other tasks such as answering the phone, drinking from a glass, using a second data input device, etcetera. Also, the transmitters must be spaced a significant distance from each other in order to obtain proper resolution for position and orientation. This makes for a bulky and awkward user interface. These transmitters and receivers are also expensive and add to the complexity of the device. Additionally, video and computer game operators enjoy the feeling of becoming engrossed in the game by having a data input device attached to their body in some fashion. This device fails to do so. Lastly, the device is not well suited to generate computer mouse equivalent data, should it be used in that capacity.

U.S. Pat. No. 5,488,362 (Ullman, et al), describes a glove type device that is used in place of a hand held joystick. The connection of different exposed electrical contacts on the glove represent corresponding joystick type functions such as up-down, left-right, and weapons fire. Joystick type functions are accomplished by moving the wrist in various directions, and push-button type functions are obtained by contacting one or more fingers to the thumb. Although an interesting transformation of a joystick, this device is nothing more than a series of electrical contacts mounted on a glove. Therefore, this device fails to take advantage of more sophisticated sensors such as a track-ball, mouse-stick, scroll-wheel, or even a hand mounted mini joystick. Also, the device completely covers the hand and therefore blocks the tactile senses. Further, the device can be easily short-circuited as the electrical contacts of the device are exposed. This would preclude drinking from a metal cup, or resting the hand on a metal object. Lastly, the glove cannot be quickly and easily attached or removed from the hand.

OBJECTS AND ADVANTAGES

Accordingly, several objects and advantages of our hand manipulated data apparatus are:
a) To provide a hand manipulated data apparatus that does not require a planar surface.
b) To provide a hand manipulated data apparatus that does not require the user to remove their hand from the keyboard area.
c) To provide a hand manipulated data apparatus that is not accidentally activated when using the computer keyboard.
d) To provide a hand-manipulated data apparatus that is not accidentally activated by performing standard office procedures such as answering the phone, writing, or holding a drinking glass.
e) To provide a hand manipulated data apparatus that does not block the tactile senses of the finger pads, whereby the user is not impaired when using the keyboard or handling other objects.
f) To provide a hand manipulated data apparatus that is user friendly and easy to operate by not requiring the user to activate more than one sensor at a time for cursor movement, and by not requiring the user to learn entirely new hand-eye coordination skills.
g) To provide a hand manipulated computer mouse that is suitable for computer use, video games, virtual reality, and industrial applications.
h) To provide a hand manipulated data apparatus that can easily be used to perform the "drag-and-drop" computer function.
i) To provide a hand manipulated data apparatus that is simple and inexpensive to manufacture by utilizing existing technologies, and by introducing the fewest number of additional circuit components.
j) To provide a hand manipulated data apparatus that appeals to handicapped persons.
k) To provide a hand manipulated data apparatus that appeals to persons suffering from carpal-tunnel-syndrome.
l) To provide a hand manipulated data apparatus that can have a plurality of sensors mounted on numerous places of the hand, or hands.
m) To provide a hand manipulated data apparatus that is suitable for use with a plurality of sensor types,
n) To provide a hand manipulated data apparatus that can have all of the sensors manipulated solely within the confines of the hand that the sensors are mounted on.
o) To provide a hand manipulated data apparatus that can be quickly and easily attached to the user's hand, or removed from the user's hand.
p) To provide a hand manipulated data apparatus that can be quickly and easily stored on the user's body.
q) To provide a hand-manipulated data apparatus with features that compare to today's most sophisticated desktop computer mice.

r) To provide a hand manipulated data apparatus that compares to today's most sophisticated video game controllers (user input devices).

s) To provide a hand manipulated data apparatus that can either have a "wired" or "wireless" connection to the computer and or video game.

Further objects and advantages will become apparent from a consideration of the drawings and ensuing description.

SUMMARY

The foregoing and other objects of the invention are attained in the transformation of a tabletop mouse (or video game controller), into a device that resides on the human hand(s). This is accomplished by placing sensors (buttons, switches, scroll-wheels, track-ball, joystick, etc.) on the human hand. These sensors are located on the human hand so as not to impede ordinary hand functions or touch-senses, but yet to allow the sensors to be activated by other parts of the hand such as the thumb and fingers. Having the sensors activated within the confines of the human hand eliminates the need for a planar surface that an ordinary tabletop mouse requires. Further, it eliminates the need for the user to remove their hand from the keyboard area in order to enter mouse-type data. It is also understood that contemporary computer mice provide the user with selectable options when configuring the computer mouse. For example the user could configure the mouse for a left-handed person in which the "left-mouse-button" would be configured as the right, and vice-versa. This invention also retains these types of user configuration capabilities.

In a typical embodiment, a dual function mouse-stick sensor is placed on the thumb side of the index finger. (Note that a mouse-stick sensor is the type of mouse sensor commonly employed in the center of laptop computer keyboards. It looks like a small button and is gently pushed in various directions resulting in mouse cursor movement on the computer screen. The most recent development in mouse stick design employs a built-in button that is activated by depressing the mouse stick. This will be referred to as a dual function mouse stick.) The user's thumb then has easy access to this sensor and can activate this sensor by gently pushing the mouse-stick in the direction of desired cursor movement. Additionally the user can utilize the dual function of the mouse stick by pressing downward on the mouse stick and activating the built in click-button. This built in button would typically be configured by the user to be equivalent to the left-click button of a tabletop mouse. This dual function mouse-stick then permits ordinary cursor movement, text highlighting, "drag-and-drop", "double-click" and so forth; all with the users thumb. Adjacent to the mouse-stick sensor is a separate click-button. This button is also easily accessible by the thumb and serves the purpose of the "right-click" mouse button of a typical tabletop mouse. Also near this first mouse-stick is a second mouse-stick. This second mouse-stick would be used in place of a scroll-wheel as employed on a conventional tabletop computer mouse. (Note, a scroll-wheel is the type of sensor that is used on a conventional tabletop mouse to scroll within software applications.) The thumb is used to activate this second mouse-stick to generate mouse equivalent "scroll-wheel" data. The invention may also have an on/off button that is easily accessible by the thumb. This would allow the user to easily turn the unit on or off. The electronics interface required for the invention may be "wired" or "wireless", and may reside inside a separate enclosure, or reside in the same enclosure as the sensors. For a "wired" mouse, the electronics enclosure typically resides next to the computer. For a "wireless" mouse, the electronics interface (transmitter) may be packaged with the sensors, or in a separate enclosure on the user's wrist, or other part of the body. The "wireless" receiver would typically reside next to the computer, or could even be built into the computer.

When necessary, the finger-mounted unit can be easily removed from the users hand. In one embodiment the finger-mounted sensors are easily retracted to the wrist mounted wireless transmitter enclosure, where they can also be quickly re-deployed back onto the user's finger(s). This provides the user with the necessary freedom to perform personal hygiene tasks such as using the bathroom, washing hands, shaking hands, eating, and so on.

This transformation of a conventional tabletop mouse, to a mouse that resides on the human hand is very beneficial. One can easily see that a planar surface is not required for cursor movement; the user's finger pads are not covered and therefore the user's keyboard touch-senses are retained; and the sensors are located so that the sensors are not accidentally activated when answering the phone, writing on paper, typing on the computer, holding a drinking glass, etcetera. In addition, conventional computer mouse sensors are utilized whereby the user is not required to learn extensively new hand-eye coordination skills. All of the functions that are typical of a conventional tabletop mouse are easily obtained through this invention, but the limitations of a tabletop mouse are eliminated.

Although the above discussion focused on the invention being mounted on a single hand, it could just as easily be mounted on both hands, other fingers or thumb, multiple fingers, or even other parts of the body. Mounting the invention on other parts of the body may be especially applicable for disabled or handicapped persons. It can also be seen that the invention can easily be used for computer and video game applications.

Finally, the low cost and ease of manufacture of the present invention is obtained by utilizing existing technologies, and by introducing the fewest number of additional circuit components. Further objects and advantages will become apparent from a consideration of the ensuing description and drawings.

DRAWING FIGURES

DESCRIPTION—FIGS. 1A THROUGH FIG. 12

FIGS. 1A through FIG. 12 depict specific preferred embodiments of the present invention for purposes of illustration only. One skilled in the art will recognize from the following discussion that alternative embodiments of the structures and methods illustrated herein may be employed without departing from the invention.

It is understood in these descriptions that conventional computer mice have a user programmable software capability. This allows the user to configure each computer mouse sensor to meet their personal requirements. As an example, a user can configure a mouse for left or right hand operation, define special buttons and scroll wheels, etcetera. The following descriptions preserve this user configuration capability. Additionally, these descriptions may use the word thumb or finger interchangeably.

Figure 1A:
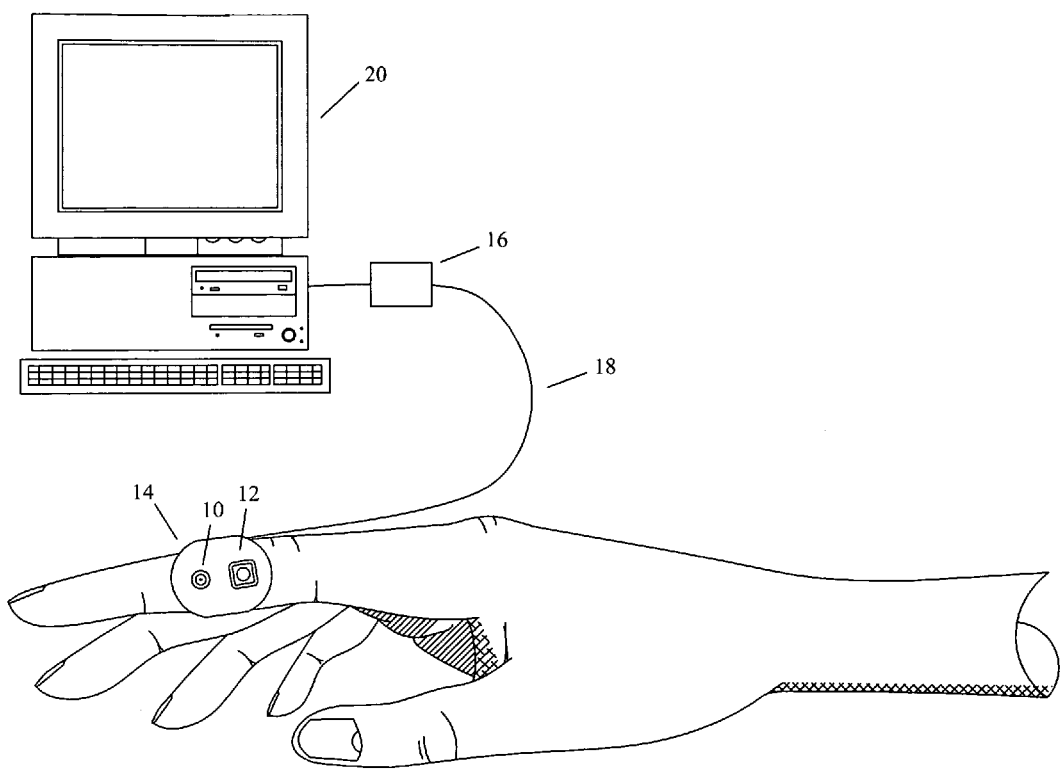
FIGS. 1A & 1B are a "wired" illustration of a basic form of the invention utilizing a single mouse-stick, and a single button.
Figure 1B:
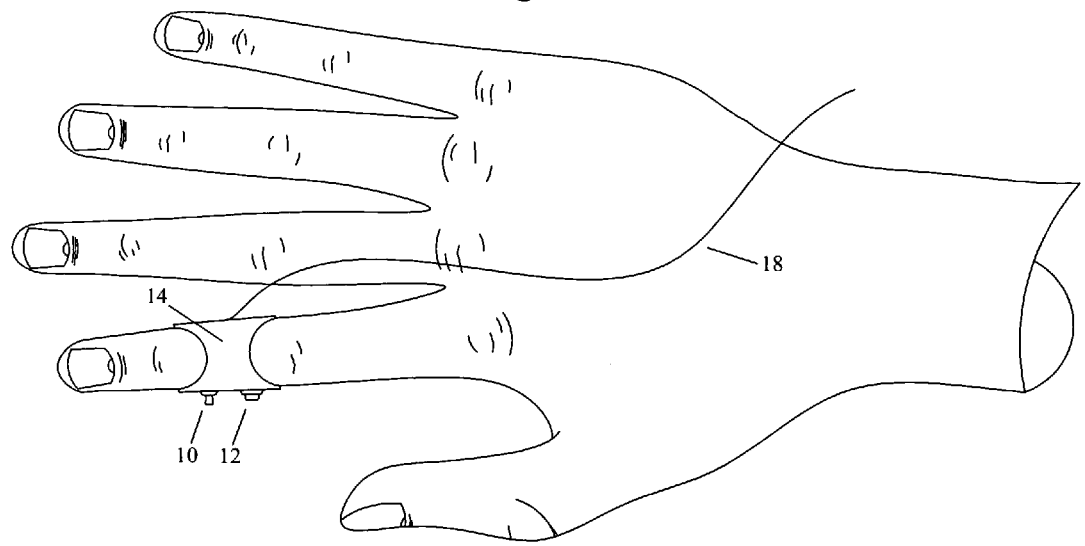

Now referring to FIGS. 1A and 1B; these figures represent a basic form of the invention by utilizing a single mouse stick 10, and a single button 12. (Note that a mouse-stick sensor is the type of mouse sensor commonly employed in the center of laptop computer keyboards. It looks like a small button and is gently pushed in various directions resulting in mouse cursor movement on the computer screen. The most recent production of mouse sticks also employ a built-in button that is activated by depressing the mouse stick. This button is most commonly configured by the user to be equivalent to the left mouse button on a conventional tabletop mouse. This dual-function mouse stick will be used for purposes of these discussions.) Sensors 10 and 12 are both mounted on the thumb side of a sensor bus 14 that is positioned on the middle digit of the index finger. The sensor bus 14 is ergonomically shaped so that movement of the finger joints is not inhibited. Sensor bus 14 would normally be lined inside with an expandable non-slip foam or similar product (not shown). This would allow sensor bus 14 to conform to a wide range of finger sizes without twisting and slipping on the finger. As the user manipulates sensors 10 and 12 with the opposing thumb, the corresponding electrical signals are carried to a electronics interface box 16 by way of a flexible multi-conductor cable 18. The interface box 16 then converts the sensory electrical signals to digital data. This mouse equivalent data is then provided to a computer 20. This embodiment can be used to generate all basic types of mouse equivalent data. This includes but is not limited to the "double-click" function, and the "drag-and-drop" function. Of particular concern in this discussion is the ability to perform the computer "drag-and-drop" function. This is easily accomplished by the user manipulating the dual function mouse stick 10 in the same way as one would with a dual-function mouse stick on a laptop computer. In doing so, the operator uses the thumb against the mouse stick 10 to position the mouse cursor as desired. Then the built-in mouse stick button is depressed while the user highlights the desired item. The button is then released. Then the user places the mouse cursor over the highlighted item and re-depresses the mouse stick button. The user then moves the mouse cursor to the drop location. Then the mouse stick button is released to drop the item. Button 12 would typically be configured by the user to be equivalent to the right mouse button on a conventional tabletop mouse. Alternatively, button 12 may be configured as an on/off button. Although this embodiment describes the interface box 16 as a separate enclosure, it is understood that it can also be incorporated into the sensor bus 14 or the computer 20. It is also understood that the electronics interface can have either a "wired" or "wireless" connection to the computer. Also notice that this unit is universal in that it can be worn on either the right or left hand. This is accomplished by removing the unit from the finger and rotating the unit 180 degrees with respect to an axis that is parallel to the index finger, or to an axis that is perpendicular to the index finger. When re-inserted onto the opposite hand, the mouse stick 10 will either be located toward the fingertip side of sensor bus 14, or toward the wrist side. This location is determined by the axis chosen for rotation. The unit may also be worn on the index finger or the thumb. To switch to a thumb application, the user simply removes the unit from the index finger and repositions the unit onto the thumb with sensors 10 and 12 facing the opposing index finger. Additionally the sensors may be relocated to a dorsal or top position by simply rotating sensor bus 14 to re-position sensors 10 and 12 on the top or dorsal side of the finger or thumb. This universal right or left hand, universal index finger or thumb, and universal side or dorsal application is typical of many of the embodiments to follow.

Figure 2A:
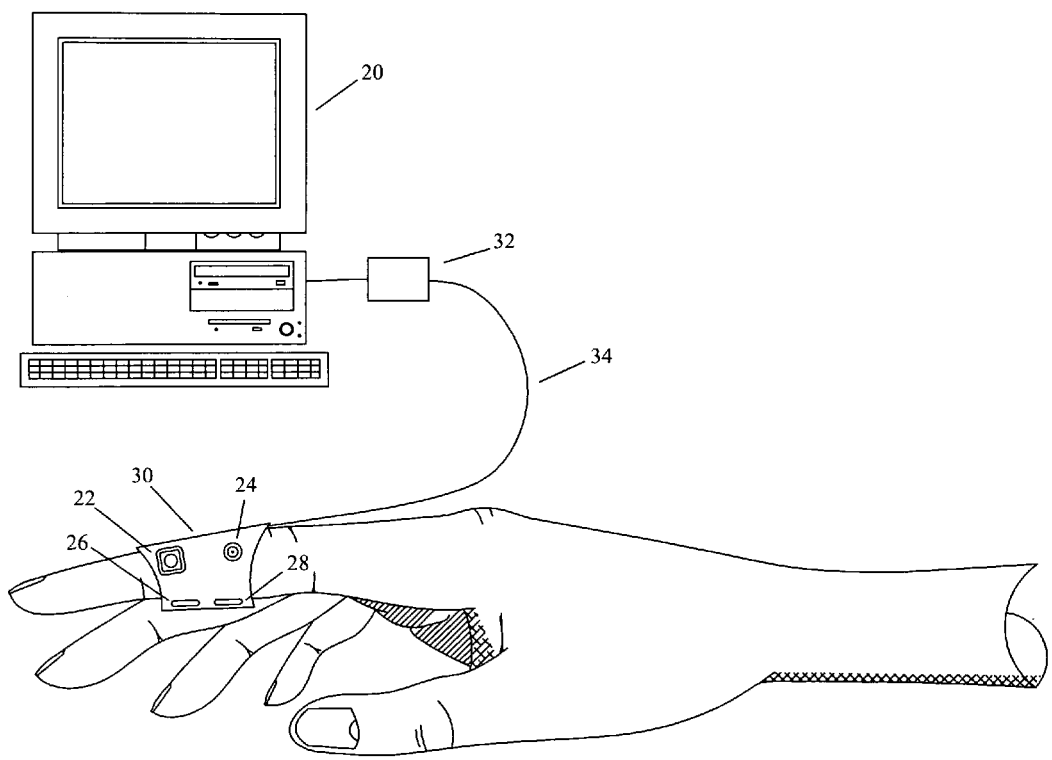
FIGS. 2A & 2B are a "wired" illustration of the invention utilizing a single mouse-stick, a single button, a horizontal navigation scroll wheel, and a vertical navigation scroll wheel.
Figure 2B:
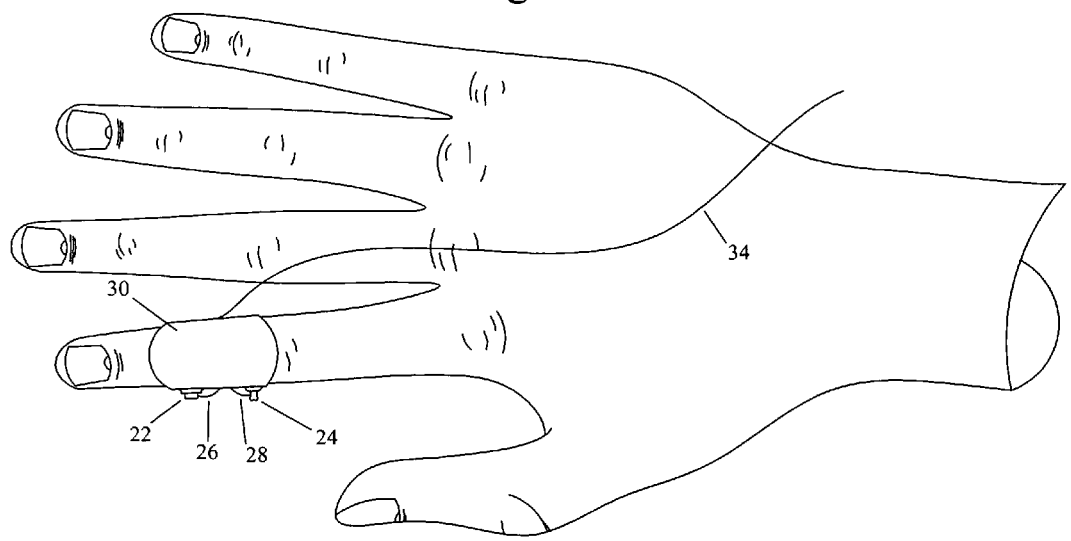

Now referring to FIGS. 2A and 2B; these figures represent an embodiment of the invention that uses scroll-wheel sensors. This embodiment includes a button 22, a dual function mouse stick 24, a vertical navigation scroll-wheel 26, and a horizontal navigation scroll-wheel 28. These sensors are all mounted on the thumb side of a sensor bus 30. Sensor bus 30 is positioned on the middle digit of the index finger and is ergonomically shaped so that movement of the finger joints is not inhibited. It is understood that while the dual function mouse stick is used to navigate throughout the computer operating system and within software applications, scroll-wheel sensors are typically only used to navigate within software applications. For example, the user may configure this embodiment to have scroll-wheel 26 configured for vertical navigation, and scroll-wheel 28 configured for horizontal navigation within a software application. This explanation of scroll-wheel usage is well known in the art. Sensor bus 30 would normally be lined inside with an expandable non-slip foam or similar product (not shown). This would allow the sensor bus 30 to conform to a wide range of finger sizes without twisting and slipping on the finger. As the user manipulates sensors 22, 24, 26, and 28 with the opposing thumb, the corresponding electrical signals are carried to a electronics interface box 32 by way of a flexible multi-conductor cable 34. The interface box 32 then converts the sensory electrical signals to digital data. This mouse equivalent data is then provided to a computer 20. This embodiment can be used to generate all forms of mouse equivalent data. This includes but is not limited to the "double-click" function, the "drag-and-drop" function, and the "scroll-wheel" functions. Although this embodiment describes the interface box 32 as a separate enclosure, it is understood that it can also be incorporated into the sensor bus 30 or computer 20. Also notice that the unit is universal in that it can be worn on either hand.

Figure 3A:
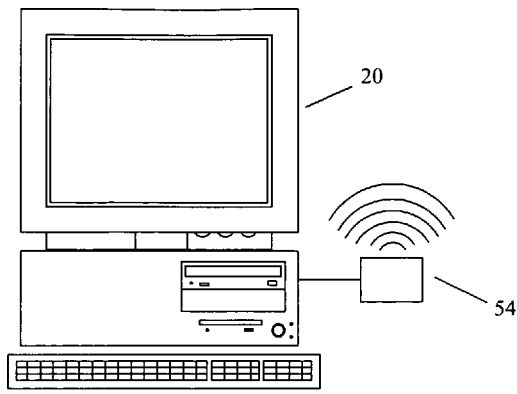
FIGS. 3A & 3B are a "wireless" illustration of the invention utilizing a first mouse-stick, a second mouse-stick in place of scroll wheels, a single button, and retractable sensors.
Figure 3A:
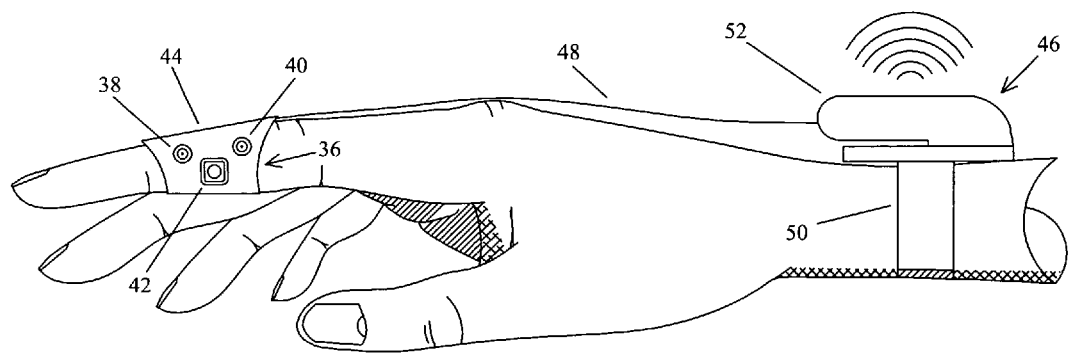
Figure 3B:
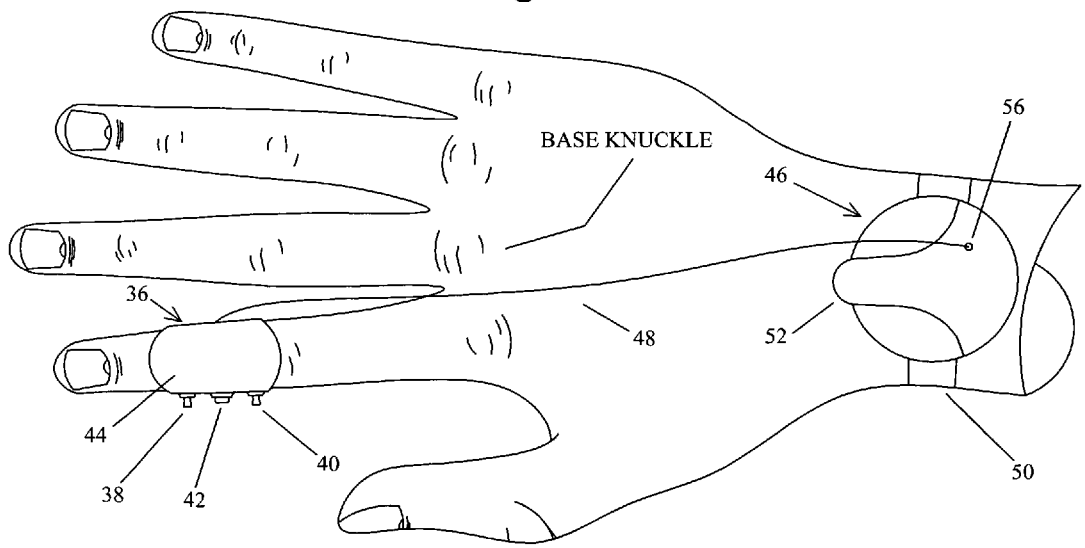
Figure 3C:
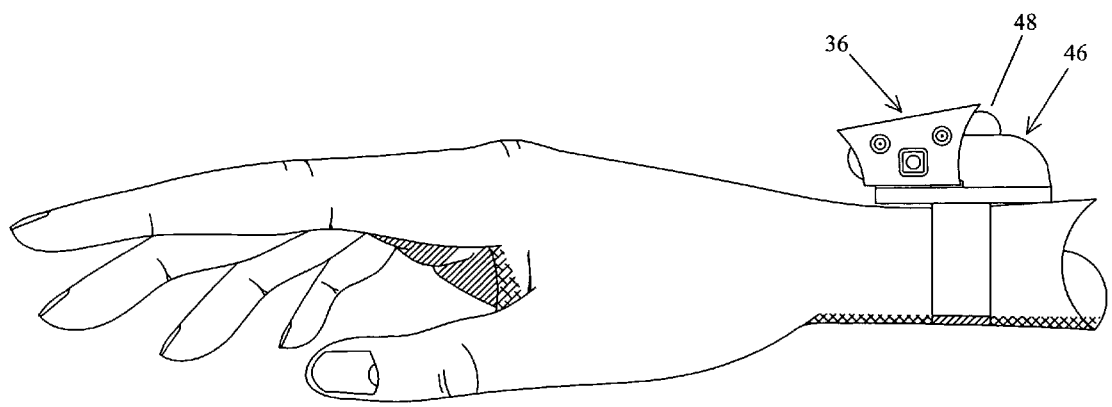
FIGS. 3C & 3D are a "wireless" illustration of the invention utilizing a first mouse-stick, a second mouse-stick in place of scroll wheels, a single button, and retractable sensors of which are shown retracted.
Figure 3D:
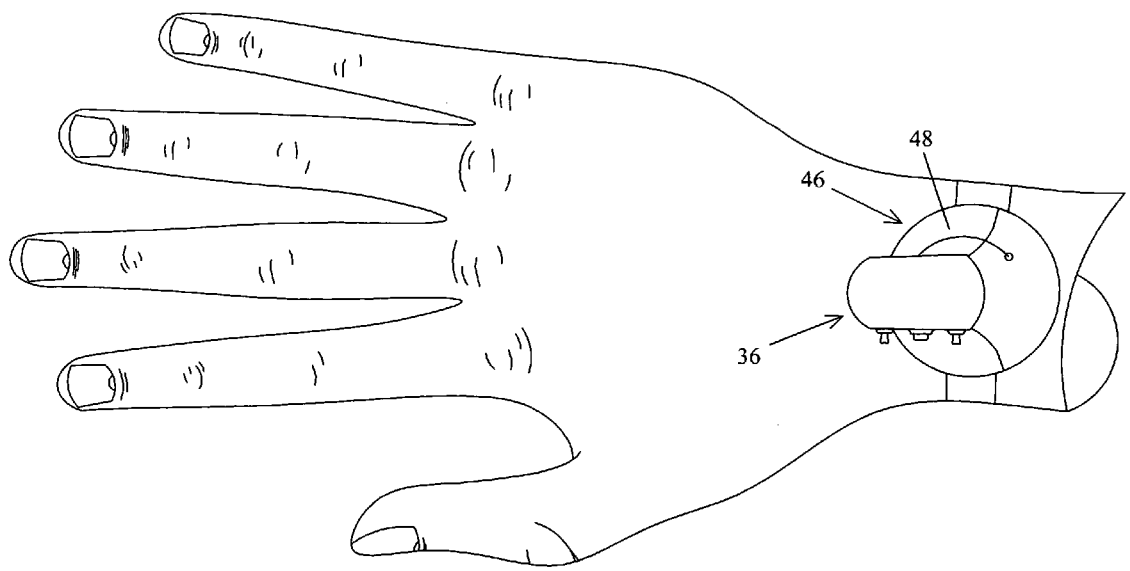

Now referring to FIGS. 3A, 3B, 3C, and 3D; these figures represent a wireless embodiment of the invention that has retractable sensors. A sensor assembly 36 consists of a first dual function mouse stick 38, a second dual function mouse stick 40, and a button 42. Sensors 38, 40, and 42 are all mounted on the thumb side of a sensor bus 44. Sensor bus 44 is positioned on the middle digit of the index finger and is ergonomically shaped so that movement of the finger joints is not inhibited. Sensor bus 44 would normally be lined inside with an expandable non-slip foam or similar product (not shown). This would allow sensor bus 44 to conform to a wide range of finger sizes without twisting and slipping on the finger. The user manipulates sensors 38, 40, and 42 with the opposing thumb. The corresponding electrical signals are carried to a wrist mounted transmitter assembly 46 by way of a retractable multi-conductor cable 48. Transmitter assembly 46 is attached to the user with a wrist strap 50. Notice that transmitter assembly 46 has a docking area 52 to position the sensor assembly 36 onto. Transmitter 46 transmits the sensor signals to a receiver 54. Receiver 54 then converts the sensory information to mouse equivalent data. This mouse equivalent data is then provided to a computer 20. Transmitters and receivers of this type are currently used in the art for wireless computer mice and keyboards. This embodiment gives the user the flexibility to configure either mouse stick for mouse cursor movement. The remaining mouse stick is then configured to generate "scroll-wheel" equivalent data. This "scroll-wheel" mouse stick is then used to navigate within software applications. Button 42 would typically be configured by the user as a click button, or as an on/off button. Notice that cable 48 exits the sensor assembly 36 in a manner that directs it between the index finger base knuckle, and the middle finger base knuckle. (The base knuckle is defined in FIG. 3B.) This neatly dresses the cable 48 between the two knuckles in a captive fashion that prevents the cable 48 from slipping off the top of the hand. This eliminates the need for an additional cable hold down strap between the sensor assembly 36 and the transmitter assembly 46. Cable 48 is retracted and extracted from the transmitter assembly 46 through opening 56. This spring loaded retraction keeps the cable 48 snug between the knuckles, and allows the sensor assembly 36 to be retracted and positioned onto docking area 52 of the transmitter assembly 46 as shown in FIGS. 3C and 3D. The design and manufacture of retractable cabling is well known in the electrical extension cord, robotic, and instrumentation industries. This embodiment can be used to generate all forms of mouse equivalent data. This includes but is not limited to the "double-click" function, the "drag-and-drop" function, and the "scroll-wheel" functions. Although this embodiment describes the transmitter assembly 46 as a separate enclosure, it is understood that it can also be incorporated into the sensor assembly 36. Likewise, receiver 54 could be incorporated within computer 20.

Figure 4A:
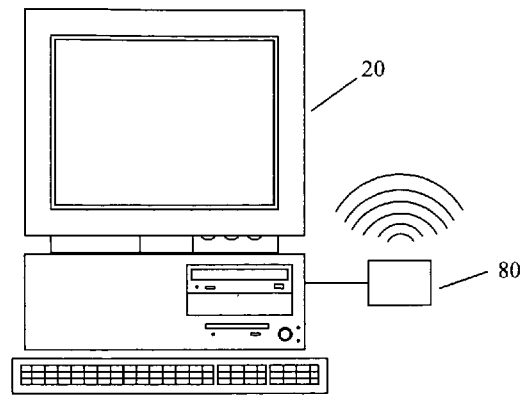
FIGS. 4A & 4B are a "wireless" illustration of the invention utilizing a first mouse-stick, a second mouse-stick mounted on the dorsal fingertip, two buttons, and retractable sensors.
Figure 4A:
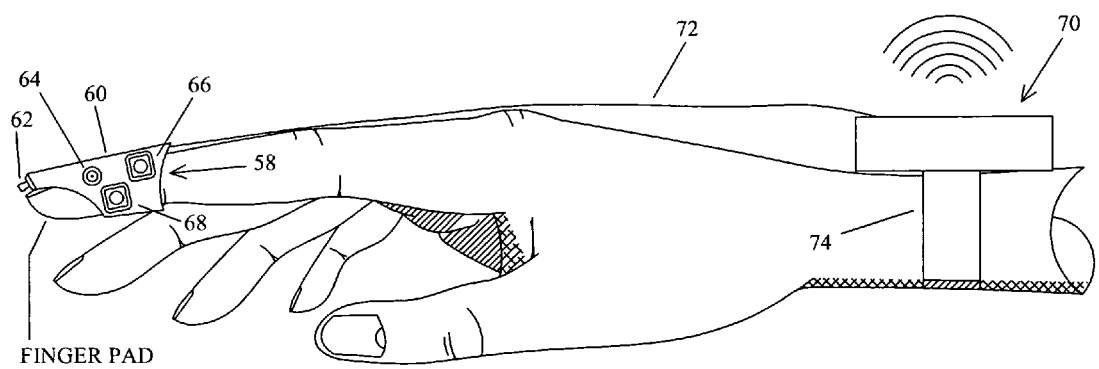
Figure 4B:
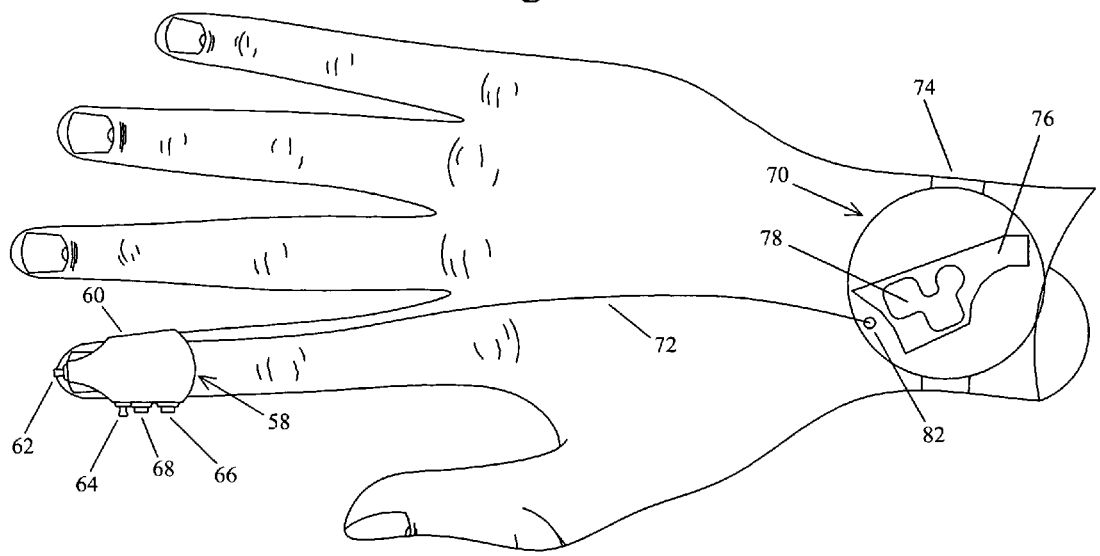
Figure 4C:
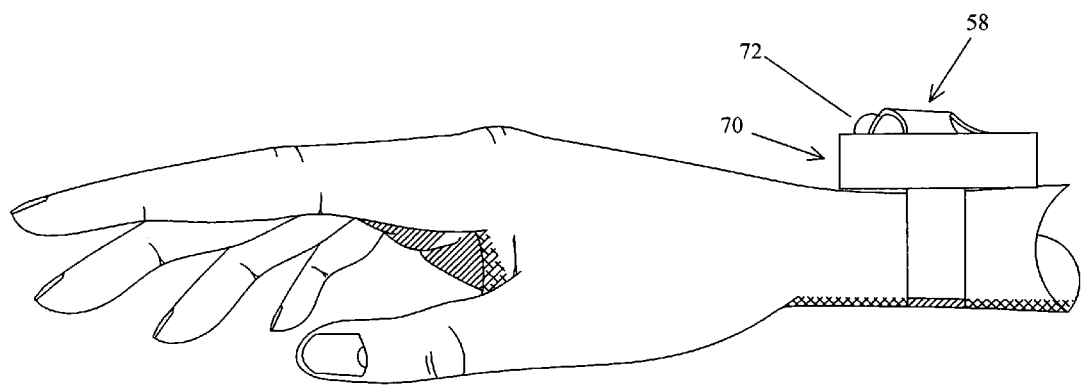
FIGS. 4C & 4D are a "wireless" illustration of the invention utilizing a first mouse-stick, a second mouse-stick mounted on the dorsal fingertip, two buttons, and retractable sensors of which are shown retracted.
Figure 4D:
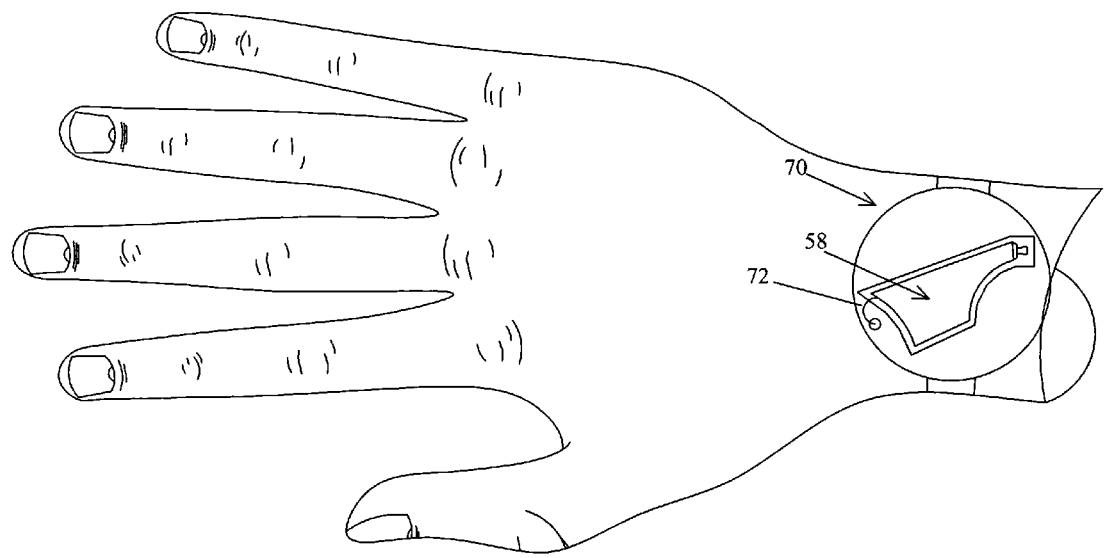

Now referring to FIGS. 4A, 4B, 4C, and 4D; these figures represent a second wireless embodiment of the invention that has retractable sensors. In this embodiment a sensor assembly 58 is mounted on the last digit of the index finger. Sensor assembly 58 consists of a sensor bus 60, a first dual function mouse stick 62 mounted on the dorsal tip of sensor bus 60, a second dual function mouse stick 64 mounted on the thumb side of sensor bus 60, and a first button 66 and second button 68 both of which are mounted on the thumb side of sensor bus 60. Notice that sensor bus 60 is ergonomically shaped so that the finger pad is not covered, and so that movement of the finger joint is not inhibited. The finger pad is defined in FIG. 4A as that portion of the finger or thumb that is normally used to obtain fingerprints. Having the finger and thumb pads exposed will retain the touch senses of the user's fingertip as needed for keyboard operation and other functions. Sensor bus 60 would normally be lined inside with an expandable non-slip foam or similar product (not shown). This would allow sensor bus 60 to conform to a wide range of finger sizes without twisting and slipping on the finger. The user manipulates sensors 62, 64, 66, and 68 with the opposing thumb. Alternatively, sensor 62 may also be manipulated by moving the index fingertip against an alternate surface such as a tabletop, the user's pant-leg, the armrest of a chair, etcetera. Also notice that sensor 62 is positioned just far enough from the finger tip so as not to interfere with keyboard operation, but yet is positioned forward enough to allow manipulation with the thumb or alternate surface. Sensory electrical signals are carried to a wrist mounted transmitter assembly 70 by way of a retractable multi-conductor cable 72. Transmitter assembly 70 is attached to the user with a wrist strap 74. Notice that transmitter assembly 70 has a first recess area 76 to position the sensor assembly 58 into. Additionally, first recess area 76 has a second recess area 78 for the side-mounted sensors 64, 66, and 68 to fit into. Transmitter 70 transmits the sensor signals to a receiver 80. Receiver 80 then converts the sensory information to mouse equivalent data. This mouse equivalent data is then provided to a computer 20. Transmitters and receivers of this type are currently used in the art for wireless computer mice and keyboards. This embodiment gives the user the flexibility to configure either mouse stick for mouse cursor movement. The remaining mouse stick is then configured to generate "scroll-wheel" equivalent data. This "scroll-wheel" mouse stick is then used to navigate within software applications. Buttons 66 and 68 would typically be configured by the user either as a click button, or as an on/off button. Notice that cable 72 exits the sensor assembly 58 in a manner that directs it between the index finger base knuckle, and the middle finger base knuckle. This neatly dresses the cable 72 between the two knuckles in a captive fashion that prevents the cable 72 from slipping off the top of the hand. This eliminates the need for an additional cable hold down strap between the sensor assembly 58 and the transmitter assembly 70. Cable 72 is retracted and extracted from the transmitter assembly 70 through opening 82. This spring loaded retraction keeps the cable 72 snug between the knuckles, and allows the sensor assembly 58 to be retracted and docked into recess areas 76 and 78 of the transmitter assembly 70 as shown in FIGS. 4C and 4D. The design and manufacture of retractable cabling is well known in the electrical extension cord, robotic, and instrumentation industries. This embodiment can be used to generate all forms of mouse equivalent data. This includes but is not limited to the "double-click" function, the "drag-and-drop" function, and the "scroll-wheel" functions. Although this embodiment describes the transmitter assembly 70 as a separate enclosure, it is understood that it can also be incorporated into the sensor assembly 58. Likewise, receiver 80 could be incorporated within computer 20. Although not shown, an additional feature that could be incorporated into this embodiment would be a second fingertip sensor that is mounted on the wrist side of sensor bus 60. This would be directly opposite and symmetric to sensor 62 and would be used as a fingertip sensor when the unit is placed on the thumb or the opposite hand. This would permit universal right or left-hand, or universal finger or thumb operation. Yet another embodiment (not shown) could include a rotatable split ring sensor bus. This would employ two adjacent rings where sensors 64, 66, and 68 would be on a first ring, and sensor 62 would be on a second ring. This second ring would have a portion removed to expose the finger pad. This embodiment would allow sensor 62 to be repositioned (rotated to the top) when relocating the assembly from the index finger to a thumb, or to a different hand.

Figure 5A:
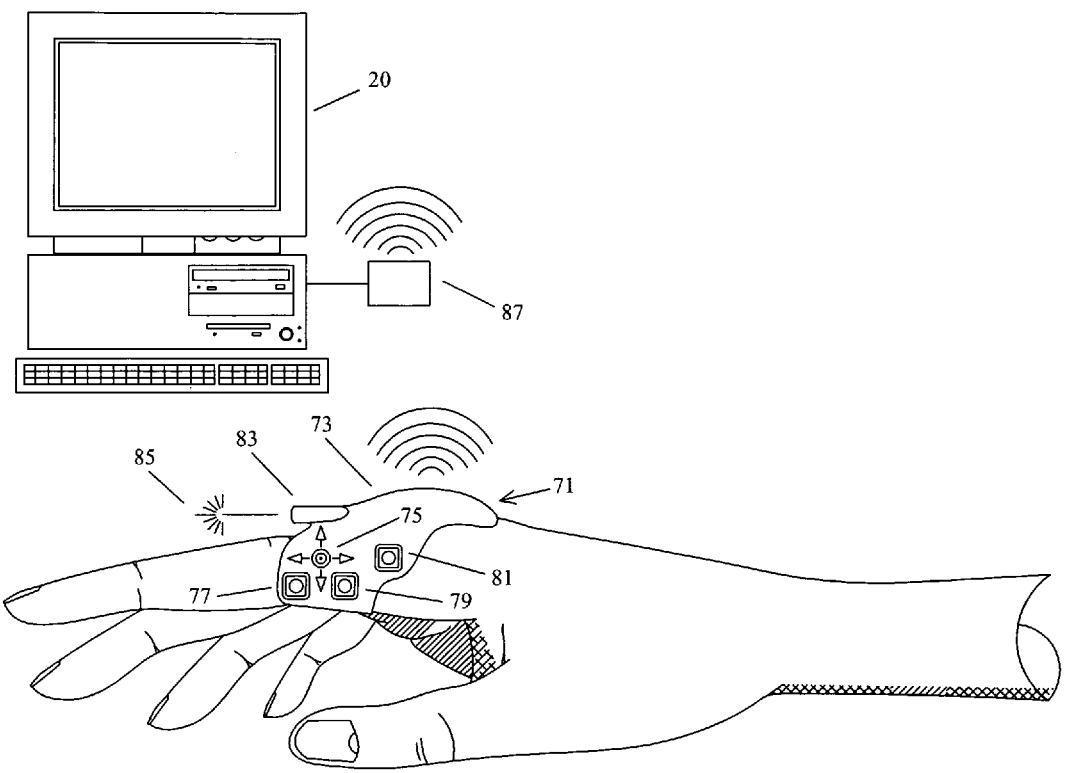
FIGS. 5A & 5B are a "wireless" illustration of the invention utilizing a mouse-stick, two mouse buttons, a laser pointer, and a laser activation button.
Figure 5B:
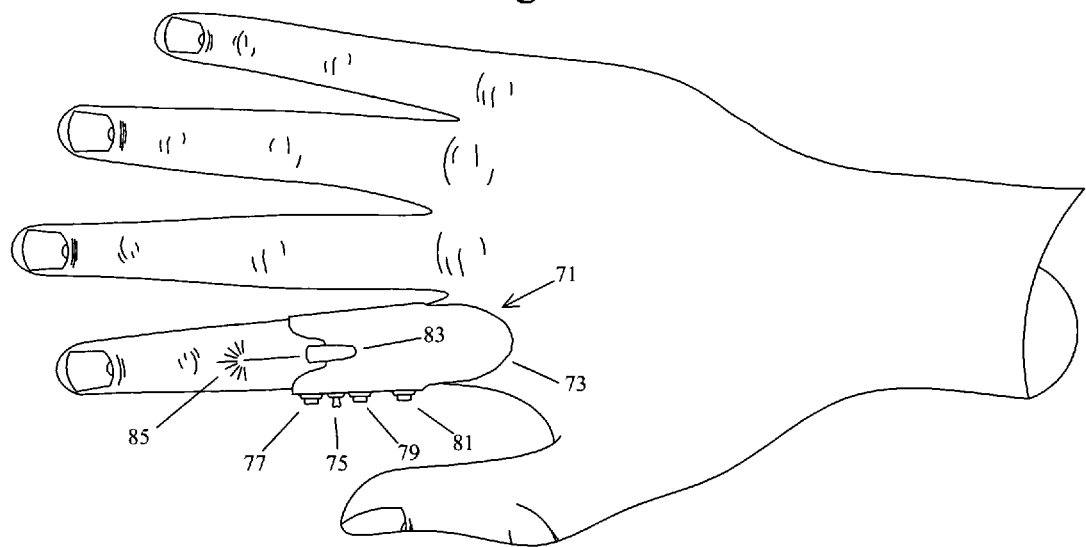

Now referring to FIGS. 5A, and 5B; these figures represent a wireless embodiment of the invention that is well suited for overhead computer presentations. In this embodiment a sensor assembly 71 is mounted on the first digit of the index finger. Sensor assembly 71 consists of a sensor bus 73. Mounted on the thumb side of sensor bus 73 are a dual function mouse stick 75, a first mouse button 77, a second mouse button 79, and a laser pointer activation button 81. Mounted on the top or dorsal side of sensor bus 73 is a laser pointer 83. Notice that sensor bus 73 is ergonomically shaped so that movements of the finger joints are not inhibited. Sensor bus 73 would normally be lined inside with expandable non-slip foam or similar product (not shown), or a hook and loop fastening strap (also not shown). This would allow sensor bus 73 to conform to a wide range of finger sizes without twisting and slipping on the finger. The user manipulates sensors 75, 77, 79, and 81 with the opposing thumb. This is accomplished by using the thumb tip, or the side of the thumb as may be appropriate. Note that laser pointer 83 only generates a laser output 85 when the laser pointer button 81 is activated. Sensory output is presented to the electronics interface (wireless transmitter & battery that are not shown) that are internal to sensor assembly 71. Notice the larger sensor bus 73 for enclosing the electronics interface (wireless transmitter and/or receiver), and the battery. The electronics interface then transmits the sensor signals to a receiver 87. Receiver 87 then converts the sensory information to mouse equivalent data. This mouse equivalent data is then provided to a computer 20. (Computer input devices that include laser pointers are currently used in the art for overhead computer presentations. These are handheld devices that are shaped like a television remote control.) Buttons 77, 79, and 81 would typically be configured by the user either as a click button, an on/off button, a laser pointer button, a presentation "page forward" or "page reverse" button, or even a mode button that will switch the unit between different operational modes. This embodiment can be used to generate all forms of mouse equivalent data. This includes but is not limited to the "double-click" function, the "drag-and-drop" function, and etcetera. Although this embodiment describes the receiver assembly 87 as a separate enclosure, it is understood that it can also be incorporated within computer 20. Naturally this embodiment can be made without laser pointer 83.

Figure 6A:
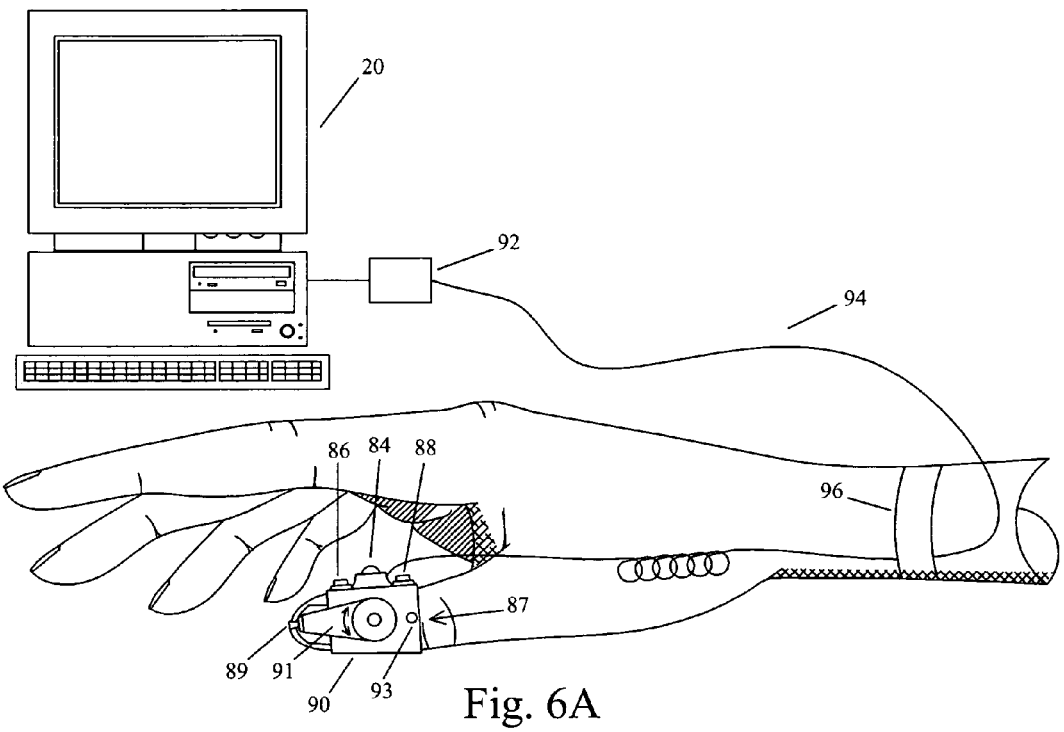
FIGS. 6A & 6B are a universal right or left hand, and universal thumb or finger illustration of the invention.
Figure 6B:
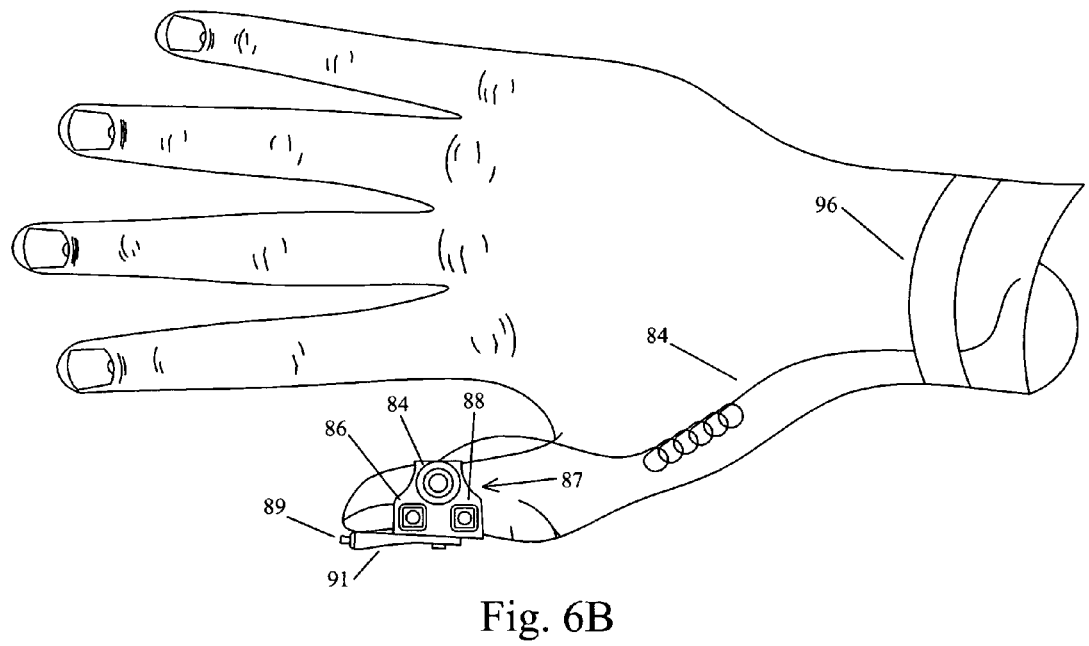

Now referring to FIGS. 6A and 6B; these figures represent a universal right or left-hand, and universal thumb or index finger embodiment of the invention. A sensor assembly 87 utilizes a mini track-ball 84, a first button 86, a second button 88, and a dual function mouse stick 89. The use and manufacture of track-ball sensors is well known in the art. Sensors 84, 86, and 88 are all mounted on the index finger side of a thumb mounted sensor bus 90. Sensor 89 is mounted on a rotatable bus extension 91. Bus extension 91 is able to pivot toward the front or rear of bus 90. This permits the user to conveniently re-position sensor 89 for either right or left-hand operation, and thumb or index finger operation. In doing so the user removes the unit from the thumb, then re-positions sensor bus 90 on the opposite thumb with sensors 84, 86, and 88 facing the index finger, then sensor 89 is rotated toward the tip of the thumb. Alternatively, the thumb mounted sensor bus could be re-positioned on the index finger of the same hand with sensors 84, 86, and 88 facing the thumb. Sensor 89 would then be rotated toward the fingertip. Once rotated into position, bus extension 91 is held in place by a recessed detent 93. The underside of bus extension 91 has a male portion that securely snaps into detent 93. Not shown is the second detent underneath the current position of bus extension 91. Sensor bus 90 is mounted on the last digit of the thumb or finger and is ergonomically shaped so that movement of the finger joint is not inhibited. Additionally, notice that bus 90 does not cover the thumb pad. This preserves the tactile senses of the thumb for holding a writing pen, etcetera. Sensor bus 90 would normally be lined inside with an expandable non-slip foam or similar product (not shown). This would allow sensor bus 90 to conform to a wide range of finger or thumb sizes without twisting and slipping on the finger. As the user manipulates sensors 84, 86, 88 and 89 with an opposing finger(s) or thumb, the corresponding electrical signals are carried to a electronics interface box 92 by way of a flexible multi-conductor cable 94. This cable is neatly dressed away from the hand with a wrist strap 96. The interface box 92 converts the sensory electrical signals to digital data. This mouse equivalent data is then provided to a computer 20. In this embodiment the user would configure the track-ball 84 and the mouse stick 89 for either mouse cursor movement, or to perform the scroll-wheel function. Buttons 86 and 88 would typically be configured by the user to be equivalent to the left and right buttons of a conventional tabletop computer mouse. Notice in this embodiment that sensors 84, 86, 88, and 89 are positioned on sensor bus 90 so as not to impede thumb or finger interaction with the computer keyboard. Additionally, it is seen that the sensors will not be accidentally activated when using the computer keyboard. Although this embodiment describes the interface box 92 as a separate enclosure, it is understood that it can also be incorporated into the sensor bus 90, or the computer 20. Also notice that sensor 89 may also be manipulated by moving the thumb or finger tip against an alternate surface such as the side or top of a table, the user's pant-leg, the armrest of a chair, etceteras. Also notice that sensor 89 is positioned just far enough from the thumb tip so as not to interfere with keyboard operation, but yet is positioned forward enough to allow manipulation with a finger or alternate surface. Also notice that bus extension 91 could be implemented in different ways. For example, bus extension 91 could rotate on an axis perpendicular to that shown in this embodiment, etcetera. Yet another embodiment (not shown) would be a different kind of sensor bus that allowed the user to finely adjust the sensor position so as to obtain a customized fit. An example of this would be a bus extension that allows the user to adjust the position of the sensor back and forth relative to the fingertip.

Figure 7A:
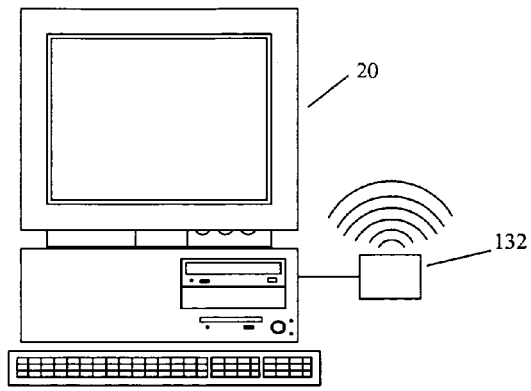
FIGS. 7A & 7B are a "wireless" illustration of the invention utilizing sensors mounted on multiple fingers and multiple finger digits.
Figure 7A:
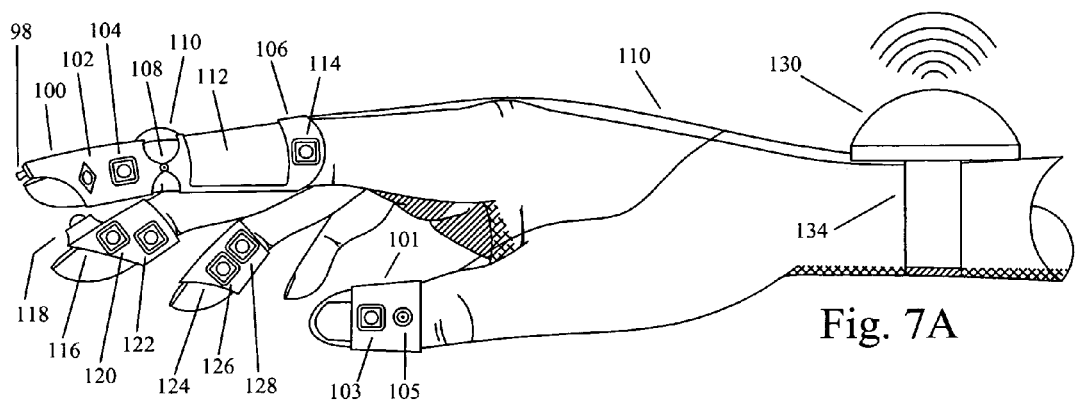
Figure 7B:
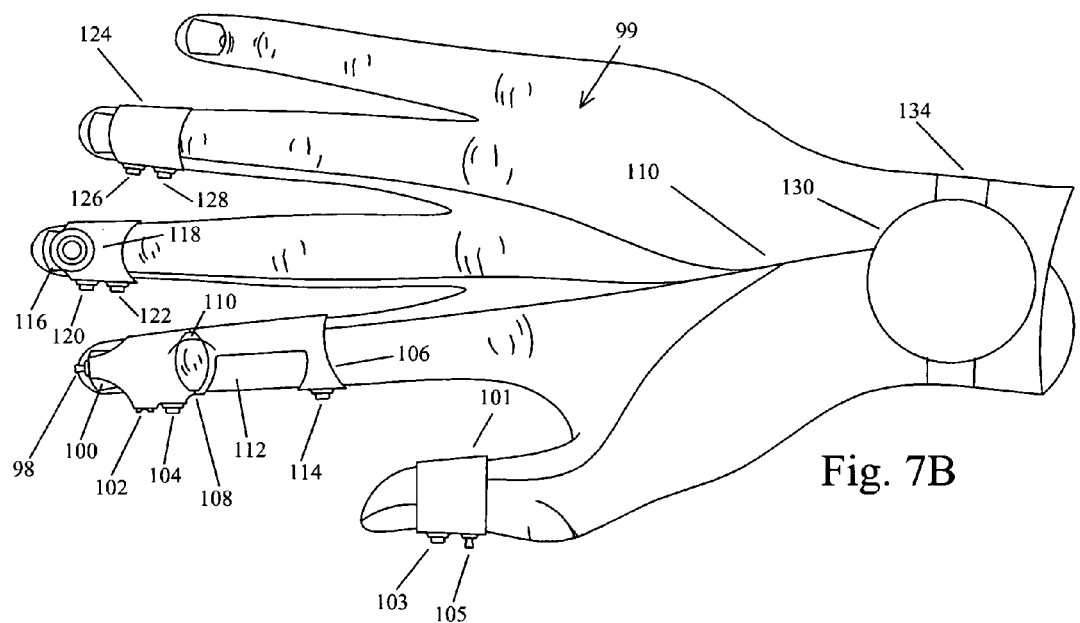

Now referring to FIGS. 7A and 7B; these figures represent a multi-finger embodiment of the invention. Here a multi-finger assembly 99 includes a dual function mouse stick 98 mounted on the dorsal tip of a first sensor bus 100 that is positioned on the last digit of the index finger. A optical sensor 102 and a button 104 are mounted on the thumb side of sensor bus 100. The manufacture and use of optical sensors is well understood in the computer mouse and instrumentation industries. The user would manipulate optical sensor 102 by rubbing the thumb over and across it. Physical contact, or near physical contact must be made with optical sensor 102 in order to manipulate it. This characteristic trait will help prevent accidental sensor activation while typing, etcetera. Although not shown, it may be necessary to place an optical filter over the optical window of sensor 102 in order to obtain the proper optical characteristics from the skin of the user's thumb. Also, the optical electronics associated with sensor 102 may be housed locally in sensor bus 100, or remotely located by fiber optic cable to the transmitter 130. A second sensor bus 106 is mounted on the middle digit of the index finger and is attached to the first sensor bus 100 by way of a flexible joint 108 and a multi-conductor cable harness 110. Sensor bus 106 contains a touch pad sensor 112, and a button 114 both of which are mounted on the thumb side of sensor bus 106. A touch pad sensor is the type of sensor commonly located adjacent to the keyboard on laptop computers. These sensors tend to be somewhat flexible and malleable in nature. Here the touch pad sensor 112 is slightly molded to match the contour of sensor bus 106. The touch pad sensor 112 is manipulated by the user rubbing the opposing thumb on the sensor in the direction of desired cursor movement. A third sensor bus 116 is mounted on the last digit of the middle finger. Here a mini track-ball sensor 118 is mounted on the dorsal or top side of sensor bus 116. Mounted on the thumb side of sensor bus 116 is a first button 120, and a second button 122. A forth sensor bus 124 is mounted on the last digit of the ring finger. On the thumb side of sensor bus 124 is mounted a first button 126, and a second button 128. A fifth sensor bus 101 is mounted on the last digit of the thumb. Mounted on the dorsal or top side of sensor bus 101 is a button 103 and a dual function mouse stick 105. Sensors 103 and 105 can be easily manipulated by one or more of the opposing fingers. Additionally, sensor bus 101 can be rotated to position sensors 103 and 105 toward the index finger in a side-mounted fashion. Notice that the multi-conductor cable harness 110 connects all five sensor bus assemblies to the transmitter 130. Transmitter 130 transmits the sensor information to receiver 132. Receiver 132 then converts the sensory information to mouse equivalent data and presents it to a computer 20. Transmitter 130 is attached to the user with a wrist strap 134. Whether the application is computer, video game, industrial, or other; the user will configure each sensor as desired for the application at hand. All of the finger sensors described in this embodiment are easily accessible by the opposing thumb. Likewise, the thumb-mounted sensors are easily accessible by one or more of the fingers. Additionally, dorsal mounted sensors 98, 103, 105 and 118 can be activated by manipulating against an alternate surface such as a tabletop, the user's leg, the armrest of a chair, etcetera. Notice that sensors 98, 103, 105 and 118 are positioned far enough back from the fingertip so as not to interfere with computer keyboard operation, but yet are far forward enough to be easily manipulated by the thumb, finger(s), or an alternate surface. Also notice in this embodiment that each sensor bus is ergonomically shaped to not block the fingertip touch senses, or impede joint movement. This ergonomic design will not impede computer keyboard operation, or other similar duties performed by the hand.

Figure 8A:
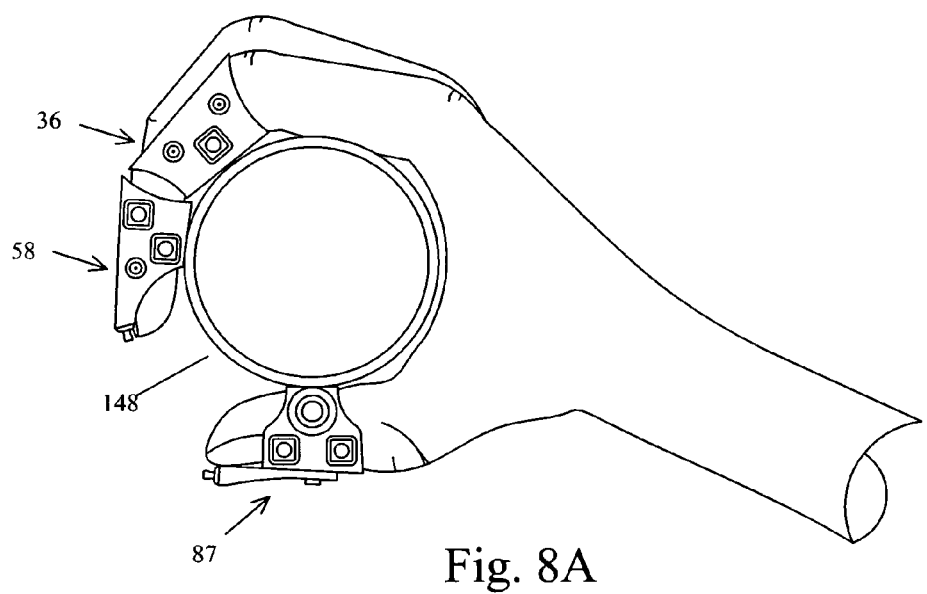
FIG. 8A is an illustration of the invention being used with an ordinary drinking glass.
Figure 8B:
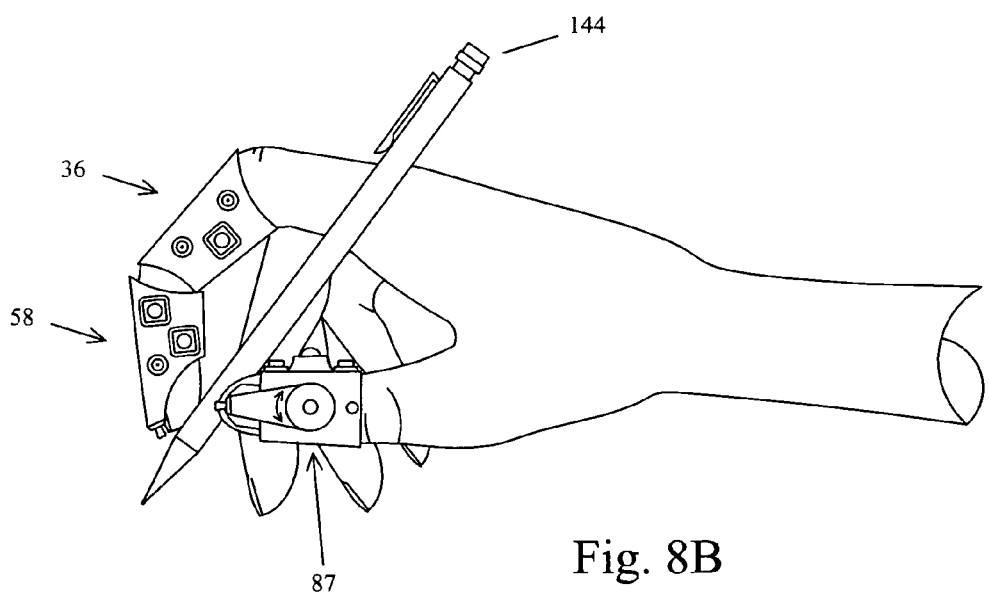
FIG. 8B is an illustration of the invention being used with an ordinary writing pen.
Figure 8C:
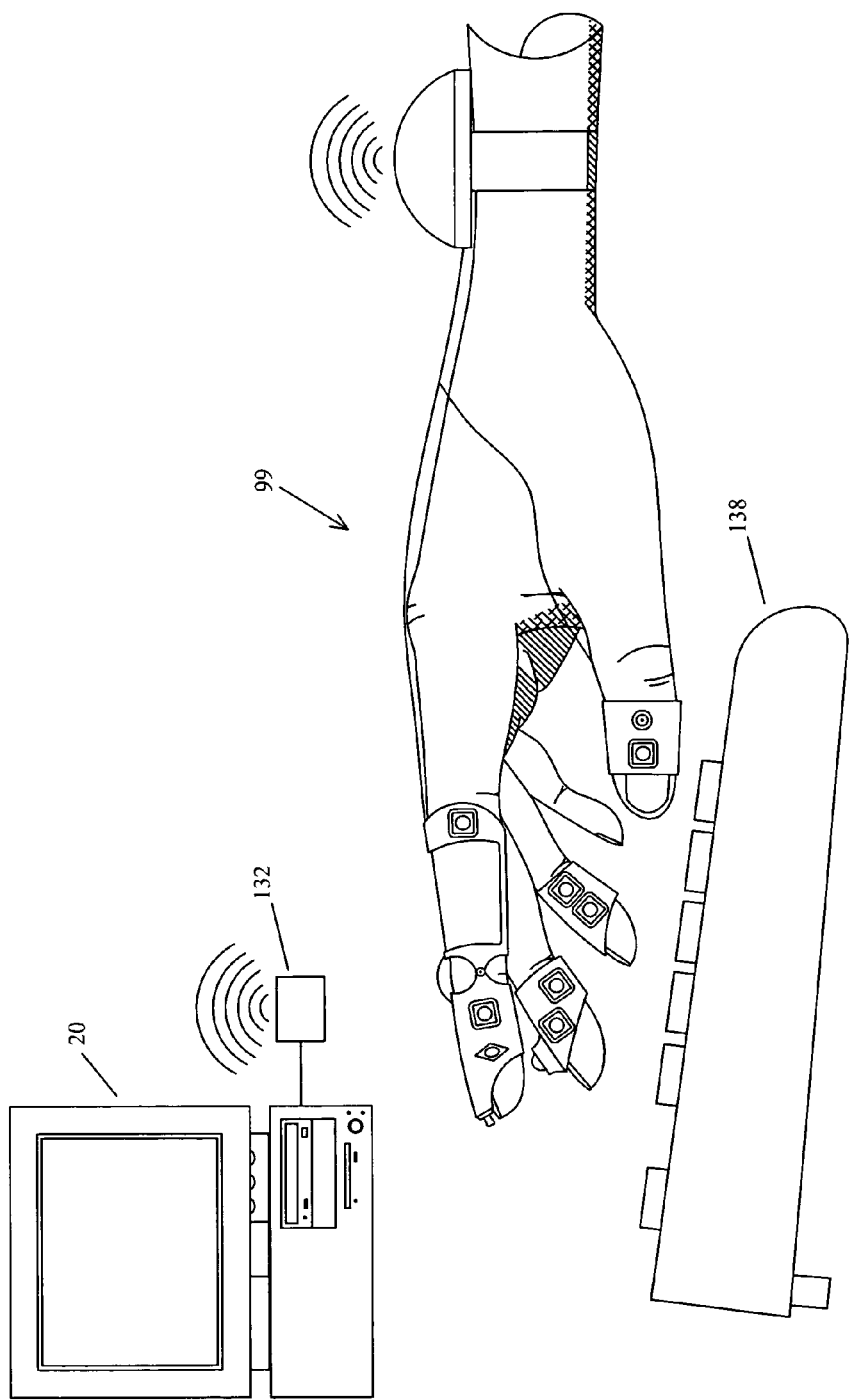
FIG. 8C is an illustration of the invention being used with an ordinary computer keyboard.

Now referring to FIGS. 8A, 8B and 8C; these figures demonstrate how the invention can be utilized by the user without interfering with other standard procedures. These figures will incorporate sensor assemblies from previously discussed embodiments. Here in FIG. 8A we see the sensor assembly 36 from FIG. 3A, sensor assembly 58 from FIG. 4A, and sensor assembly 87 from FIG. 6A being used with an ordinary drinking glass 148. Notice that the user retains finger flexibility as needed to hold glass 148 without accidentally activating any sensors. Now referring to FIG. 8B we see the sensor assembly 36 from FIG. 3A, sensor assembly 58 from FIG. 4A, and sensor assembly 87 from FIG. 6A being used with an ordinary writing pen 144. Notice that the user can hold and write with the pen without accidentally activating any sensors, and without impairment of finger joint movement. In FIG. 8C we see the multi-finger embodiment 99, computer 20, and wireless receiver 132 from FIG. 7A being used with a computer keyboard 138. Notice that the thumb and finger tips are not covered and that finger joint movement is not impaired. This embodiment preserves the fingertip touch senses and joint movement of the user as needed for computer keyboard operation. Also notice that the sensors are located in a manner that prevents accidental sensor activation while typing. It is understood that there may be some tasks that will make it difficult to not accidentally activate a sensor. Under these circumstances the user can simply temporarily turn the unit off. This could be very easily performed by configuring one of the sensor buttons as an on/off button and using it accordingly. Alternatively the user could even momentarily remove the device, or just retract the sensor assemblies as described previously for FIGS. 3D and 4D.

Figure 9:
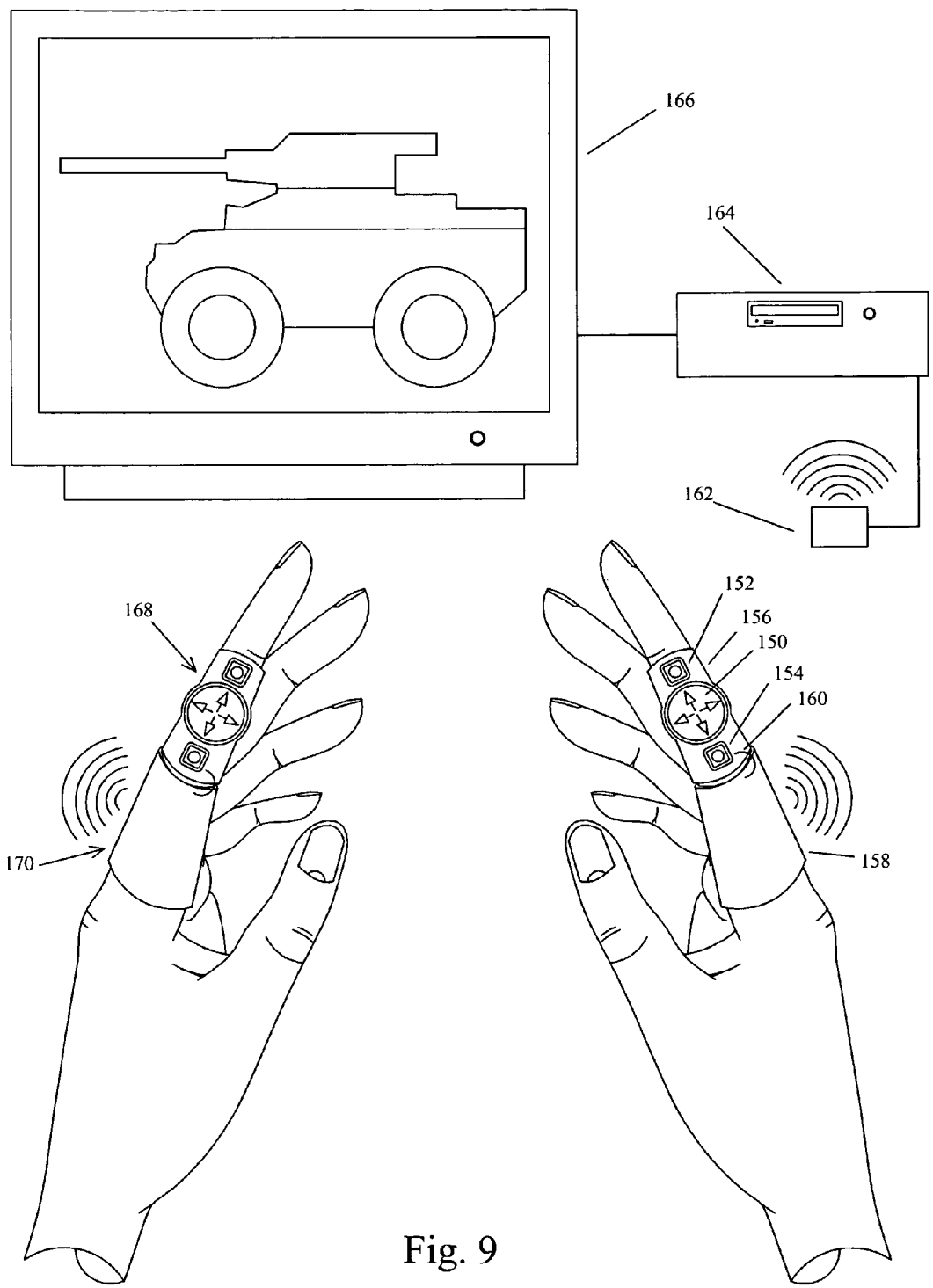
FIG. 9 is an illustration of the invention being used as a video game controller.

Now referring to FIG. 9. This embodiment demonstrates the invention being used as a dual-hand video game controller. Here a game pad 150, a first button 152, and a second button 154 are mounted on the thumb side of a sensor bus 156. A game pad is the type of sensor commonly deployed on video game controllers. It functions in the same manner as a joystick controller but has a much lower profile. Sensor bus 156 is mounted on the middle digit of the index finger of the right hand. Located on the first digit of this index finger is a transmitter 158. Transmitter 158 is connected to the sensor bus 156 with a multi-conductor cable 160. Transmitter 158 transmits the sensory information to a receiver 162. Receiver 162 then conditions the sensory information to a data-type that is acceptable to a video game box 164. The video game box 164 then presents the corresponding audio and video signals to a television 166. Located on the left hand of the user is a second sensor assembly 168, and a second transmitter assembly 170. Notice that these assemblies 168 and 170 are of a universal design in that they can be used on either the right or left hand. Also notice the contoured pivot surfaces between each assembly that allows the user to move each finger joint as normal. The user manipulates the sensors with the opposing thumb of each hand in order to play video games. Notice that the user is not required to hold onto a controller as would be the case with the current art. Instead the user's hands are free to use an additional controller, a computer keyboard, etcetera. Note that the user may choose to use one or two controllers depending on the user's skill level and the type of video game being played. As with the previous discussion, these assemblies may be mounted on the thumb(s), other fingers of the hand, or both.

Figure 10:
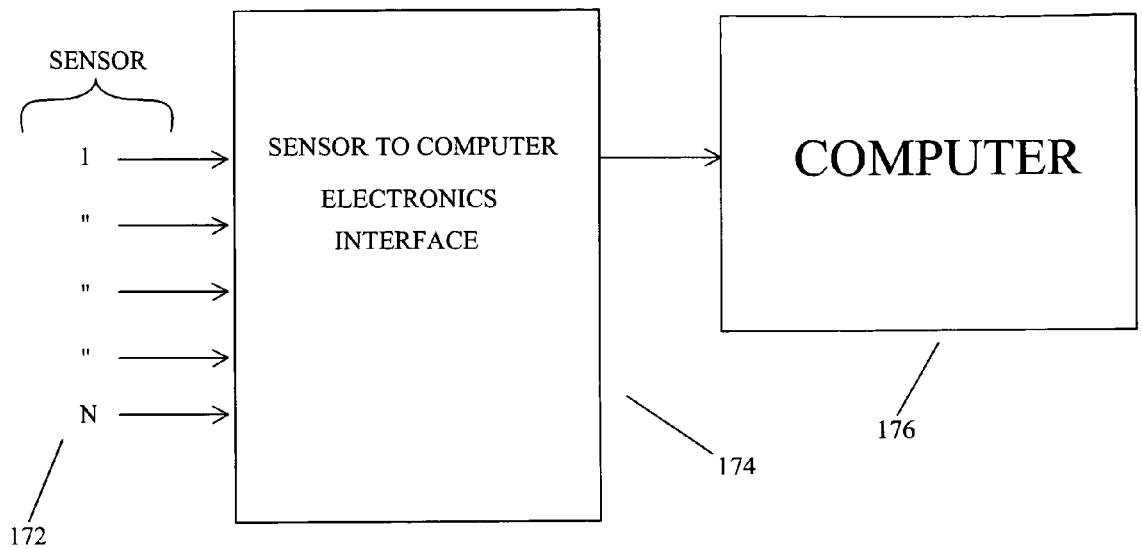
FIG. 10 is a schematic illustration of a typical "wired" embodiment of the invention.

Now referring to FIG. 10. Here we have a representative schematic of a typical embodiment of the invention. A variable number and type of sensors are manipulated by the user and are represented here as sensor input(s) 172 labeled "1" through "N". The electrical signals generated by sensor(s) 172 are converted to computer mouse equivalent data by a sensor to computer electronics interface 174. Electronics 174 then provide the mouse equivalent data to a computer 176. This technology is not new to the art as this is the design approach for most all non-wireless computer mice in the industry today. Note that the interface electronics 174 may be packaged with computer 176 rather than being a separate unit.

Figure 11:
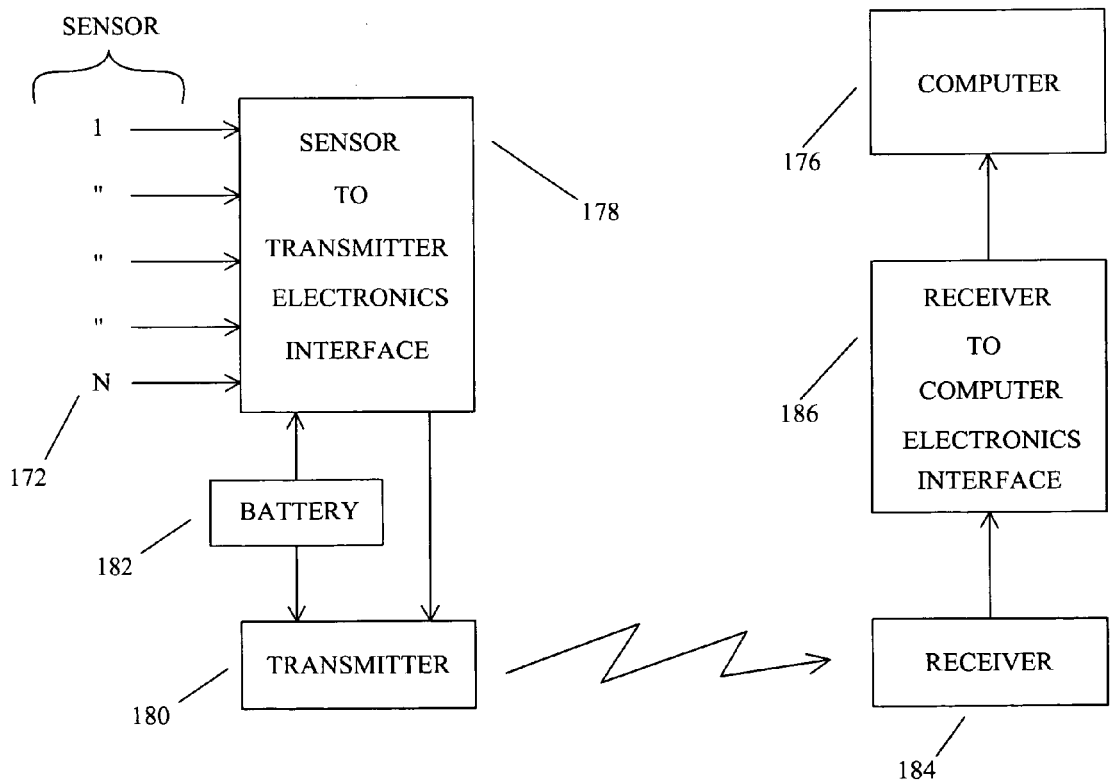
FIG. 11 is a schematic illustration of a typical "wireless" embodiment of the invention.

Now referring to FIG. 11. Here we have a representative schematic of a typical wireless embodiment of the invention. A variable number and type of sensors are manipulated by the user and are represented here as sensor input(s) 172 labeled "1" through "N". The electrical signals generated by sensor(s) 172 are conditioned by a sensor to transmitter electronics interface 178. Interface 178 presents the sensor information to a transmitter 180. Transmitter 180 and electronics interface 178 are both powered by a battery 182. Transmitter 180 transmits the sensory information to a receiver 184. The received sensor information is then conditioned by a receiver to computer electronics interface 186. Electronics interface 186 then presents the mouse equivalent data to a computer 176. This technology is not new to the art as this is the design approach for most all wireless computer mice and keyboards in the industry today. Additionally, note that the receiver 184 and interface electronics 186 could be incorporated into the computer 176 rather than being a separate unit(s). Likewise, electronics 178, transmitter 180, and battery 182 could all be designed into a single package with or without the sensors.

Figure 12:
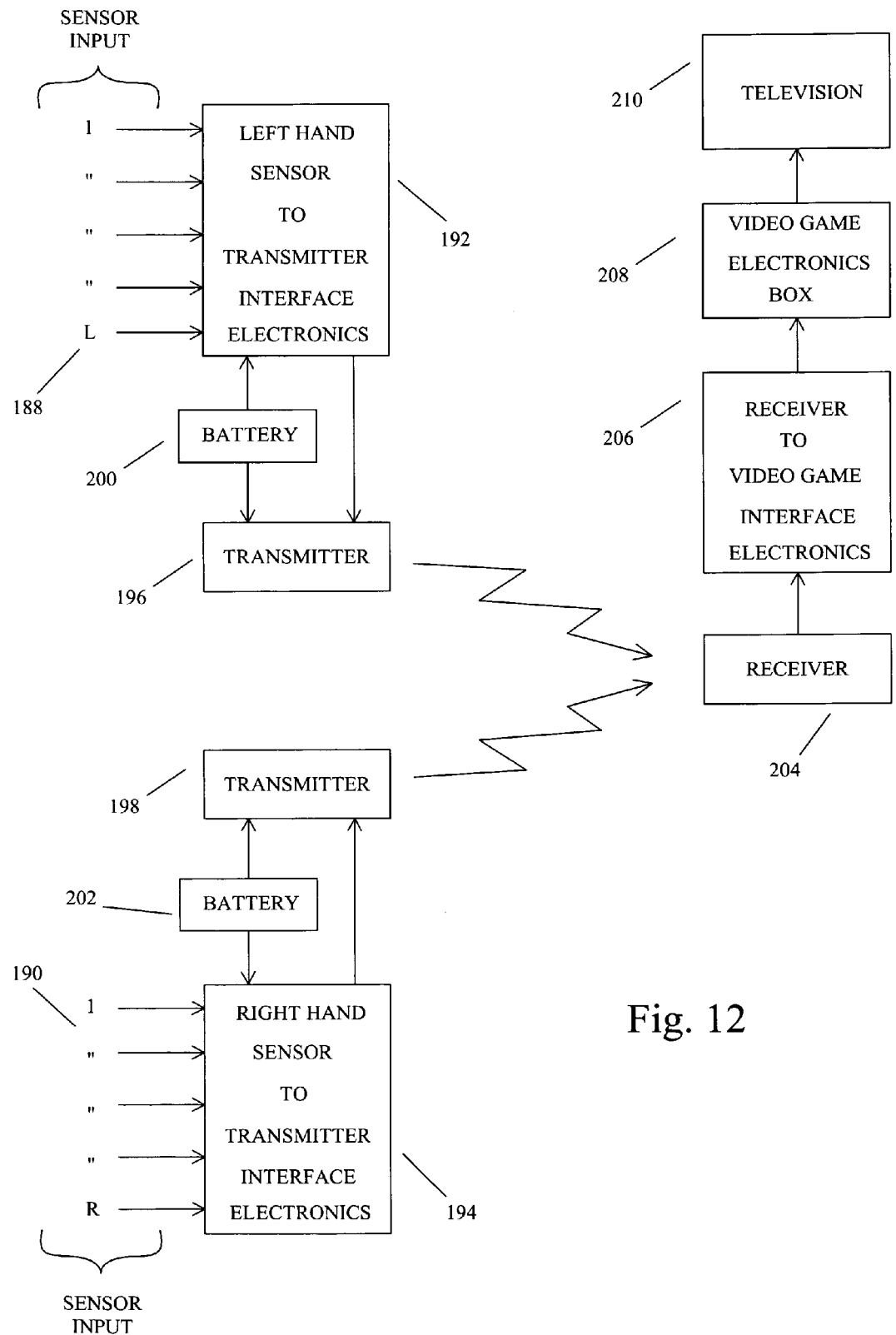
FIG. 12 is a schematic illustration of a typical embodiment of the invention being used with a video game.

Now referring to FIG. 12. Here we have a representative schematic of a typical dual hand wireless video game embodiment of the invention. A variable number and type of sensors are manipulated by the user and are represented here as a sensor input(s) 188 labeled "1" through "L" for the left hand, and a input(s) 190 labeled "1" through "R" for the right hand. The electrical signals generated by left hand sensor(s) 188 and right hand sensor(s) 190 are respectively conditioned by a left hand sensor to transmitter electronics interface 192, and a right hand sensor to transmitter electronics interface 194. Left-hand interface 192 presents the sensor information to the left-hand transmitter 196. Likewise the right hand interface 194 presents the sensor information to the right hand transmitter 198. The left hand transmitter 196 and electronics interface 192 are both powered by a battery 200. Accordingly the right hand transmitter 198 and electronics interface 194 are both powered by a battery 202. Transmitters 196 and 198 transmit their respective sensory information to a receiver 204. The received sensor information is then conditioned by a receiver to video game electronics interface 206. Electronics interface 206 then presents the video game equivalent data to a video game electronics box 208. The electronics box 208 then presents the video game audio and video signals to a television 210. This technology is not new to the art as wireless computer mice and keyboards are manufactured to work simultaneously with a single receiver assembly. This same technology approach is used here for the dual hand video game controller. Additionally, note that the receiver 204 and interface electronics 206 could be incorporated into the video game electronics box 208 rather than being a separate unit(s).

SUMMARY, RAMIFICATIONS, AND SCOPE

Accordingly, the reader will see that this device consists of one or more sensors that are mounted on the human hand. The sensors are conveniently located for easy access and manipulation by an opposing finger or thumb from the same hand that the sensors are mounted on. This arrangement overcomes the limitations of a tabletop computer mouse by not requiring a planar surface, and by not requiring the user to hold onto the device. Additionally the sensors are located in such a way that they do not impede standard office procedures such as using a computer keyboard, writing with a pen, holding a phone, etceteras. The device can also be quickly and easily attached or removed by the user. Various embodiments of the invention include "wired", "wireless", multiple finger, universal thumb or finger application, universal side or dorsal mounted sensors, and universal right or left-hand operation. Existing technologies and manufacturing techniques are utilized to minimize cost. Uses include personal computer, video game, and industrial applications. Furthermore, the device has the additional advantages in that:

The device can use new sensor types as they are developed.

The device is ergonomically shaped so that movement of the finger joints is not inhibited.

The device can be used by handicapped persons.

The device does not require the user to remove the hand from the keyboard area in order to generate mouse equivalent data.

The device prevents accidental sensor activation when using the computer keyboard.

The device prevents accidental sensor activation when performing other standard office duties such as writing with a pen, holding a phone, etceteras.

The device does not block the tactile senses of the finger-pads whereby computer keyboard use is not impaired.

The device does not require the user to learn a new set of hand-eye coordination skills.

The device does not require wrist movement that would agitate persons suffering from carpal-tunnel-syndrome.

Although the descriptions above contains many specificities, these should not be construed as limiting the scope of the invention but as merely providing illustrations of some of the presently preferred embodiments of this invention. For example, this invention could be embodied as a remote control for radio controlled airplanes, cars, or even a television. The invention can also be used in an industrial or research setting for controlling robots, cranes, machines, or other equipment. Additionally the sensors to be used can be of any type, shape, or design. Additional variations include but are not limited to the following:

The device could have the interface electronics and or wireless transmitter mounted inside the same enclosure that the sensors are mounted on, or on an adjacent finger-mounted enclosure.

The device could utilize a different approach to attaching the sensors to the hand such as using adjustable straps or hook-and-loop fasteners, using other elastic materials, etcetera.

The device could have a sensor bus with a matrix of sensor receptacles whereby the user places the desired sensor types at the locations of choice.

The device could be designed to work with multiple machines and/or computers. For example, a multi-finger assembly as previously shown in FIG. 7A could have each finger assembly control a different machine.

While preferred embodiments of the present invention has been disclosed and described in detail, and various alternate embodiments have been described, it will be understood by those skilled in the art that various changes in form and detail may be made to the present invention without departing from the spirit and scope of the invention. Thus the scope of the invention should be determined by the appended claims and their legal equivalents, rather than by the examples given.

We claim:

1. A hand manipulated data apparatus for entering commands to a machine, comprising:
   a. a sensor(s) for accepting hand manipulations, said sensor(s) having a signal output,
   b. a electronics interface for converting the signal output from said sensor(s) to a format acceptable to said machine,
   c. attaching means for affixing said sensor(s) to the human hand(s) in combination with said electronics interface,
   d. said attaching means further positioning said sensor(s) to be manipulated by the opposing finger(s) and/or thumb of the same hand that said sensor(s) are mounted on, whereby said sensor(s) are only activated by a deliberate effort of the user,
   e. said attaching means further positioning said sensor(s) so as to avoid accidental sensor activation, whereby a user can hold a glass and perform other standard hand operations without accidentally activating a sensor(s).

2. The hand manipulated data apparatus of claim 1 wherein said attaching means is further ergonomically shaped to expose the finger and/or thumb pads so as to preserve the tactile and griping qualities of the human hand.

3. The hand manipulated data apparatus of claim 1 wherein said attachment means is further ergonomically shaped, and said sensor(s) are further placed on said attachment means to facilitate universal right or left hand operation and/or universal finger or thumb operation, whereby the user can easily remove the device from one finger, thumb, or hand, and relocate the device on a different finger, thumb, or hand.

4. The hand manipulated data apparatus of claim 1 wherein said attachment means further positions a part or all of said sensor(s) in a relocatable fashion whereby a part or all of said sensor(s) can be repositioned on said attachment means for universal right or left-hand operation, and/or universal thumb or finger operation.

5. The hand manipulated data apparatus of claim 1 wherein said attachment means further positions a part or all of said sensor(s) on said attachment means in an adjustable fashion whereby the user can adjust and/or change the location(s) of a part or all of said sensor(s) to obtain customized sensor placement.

6. The hand manipulated data apparatus of claim 1 wherein said attachment means further includes a non-slip interior surface for securing said attachment means onto the hand whereby said attachment means will not twist and turn while said sensor(s) are being manipulated.

7. The hand manipulated data apparatus of claim 1 wherein said attachment means further includes a adjustable conforming means for securing said attachment means to a wide range of finger shapes and sizes, whereby a single apparatus is capable of fitting a wide range of users.

8. The hand manipulated data apparatus of claim 1 wherein said electronics interface is in a separate enclosure from said attachment means, and further includes a transferring means for conveying said sensor output to said electronics interface, whereby said attachment means for mounting said sensor(s) can be smaller in size.

9. The hand manipulated data apparatus of claim 8 wherein said transferring means comprises a cable structure that is routed between the base knuckles of the hand in a captive fashion, whereby the cable will not slip off the top of the hand, and the need for additional cable hold down straps is minimized or eliminated.

10. The hand manipulated data apparatus of claim 8 wherein said transferring means is a cable structure that exits said attachment means in a manner that facilitates universal right or left hand operation, and/or universal thumb or finger operation.

11. The hand manipulated data apparatus of claim 8 wherein said transferring means is a cable structure that is retractable to and extendable from said electronics interface enclosure, whereby said cable is maintained in a gently snug fashion.

12. The hand manipulated data apparatus of claim 8 wherein said electronics interface enclosure further includes a relocating means for repositioning said attachment means, whereby said attachment means can be removed and docked onto or into said relocating means.

13. The hand manipulated data apparatus of claim 12 further including a cable retraction and extension means, wherein said transferring means is a cable structure that is retractable to and extendable from said relocating means, whereby said cable is maintained in a gently snug fashion when said sensor(s) is deployed, and the cable is neatly withdrawn when said attachment means is retracted.

14. A method for detecting hand manipulations and entering the corresponding commands to a machine, comprising the steps of:
   a. acquiring hand manipulation information from one or more sensor(s),
   b. attaching said sensor(s) to the human hand(s) so that said sensor(s) can be manipulated by the opposing finger(s) and/or thumb of the same hand that said sensor(s) are mounted on, whereby said sensor(s) are only activated by a deliberate effort of the user,
   c. further attaching said sensor(s) so as to avoid accidental sensor activation, whereby a user can hold a glass and perform other standard hand related duties without accidentally activating a sensor(s),
   d. outputting signals from said sensor(s) that correspond to said hand manipulations,
   e. converting the output from said sensor(s) to a to a format that is acceptable to said machine,
   f. delivering said formatted signals to said machine.

15. The method of claim 14 wherein said step of attaching purposely exposes the finger and/or thumb pads so as to preserve the tactile and griping qualities of the human hand.

16. The method of claim 14 wherein said step of attaching further places said sensor(s) on the human hand(s) to facilitate universal right or left hand operation and/or universal finger or thumb operation, whereby the user can easily remove the device from one finger, thumb, or hand, and relocate the device on a different finger, thumb, or hand.

17. The method of claim 14 wherein said step of attaching further positions a part or all of said sensor(s) in a relocatable fashion whereby a part or all of said sensor(s) can be repositioned on the human hand(s) for universal right or left-hand operation, and/or universal thumb or finger operation.

18. The method of claim 14 wherein said step of attaching further positions a part or all of said sensor(s) on the human hand(s) in an adjustable fashion whereby the user can adjust and/or change the location(s) of a part or all of said sensor(s) to obtain customized sensor placement.

19. The method of claim 14 wherein said step of attaching further provides a non-slip means for securing said sensor(s) onto the hand(s) whereby said sensor(s) will not twist and turn while said sensor(s) are being manipulated.

20. The method of claim 14 wherein said step of attaching further includes a adjustable conforming means for securing said sensor(s) to a wide range of finger shapes and sizes.

21. The method of claim 14 wherein said step of attaching further includes a relocating means for removing said sensor(s) from their operating position, and repositioning said sensor(s) for storage, whereby said sensor(s) can be removed and docked onto or into said relocating means.

22. The method of claim 14 wherein said step of converting is physically removed from said sensor(s), this step further including a transferring of said sensor output to said step of converting, whereby said sensor attaching can be smaller in size.

23. The method of claim 22 wherein said transferring comprises a cable structure that is routed between the base knuckles of the hand in a captive fashion, whereby the cable will not slip off the top of the hand, and additional steps of securing the cable are minimized or eliminated.

24. The method of claim 22 wherein said step of transferring includes a cable structure that exits said sensor(s) in a manner that facilitates universal right or left hand operation, and/or universal thumb or finger operation.

25. The method of claim 22 wherein said step of transferring includes a cable structure that is further maintained in gently snug fashion.

26. The method of claim 22 wherein said step of transferring includes a cable structure that can be further repositioned for convenient use, and storage.

* * * * *